US 8,917,775 B2

(12) United States Patent
Park et al.

(10) Patent No.: US 8,917,775 B2
(45) Date of Patent: Dec. 23, 2014

(54) METHOD AND APPARATUS FOR ENCODING AND DECODING MULTI-VIEW VIDEO DATA

(75) Inventors: Gwang-hoon Park, Seongnam-si (KR);
Min-woo Park, Suwon-si (KR);
Doug-young Suh, Seongnam-si (KR);
Kyu-heon Kim, Seoul (KR)

(73) Assignees: Samsung Electronics Co., Ltd.,
Suwon-si (KR); Industry Academic Cooperation Foundation Kyunghee University, Seoul (KR)

( * ) Notice: Subject to any disclaimer, the term of this patent is extended or adjusted under 35 U.S.C. 154(b) by 1598 days.

(21) Appl. No.: 12/112,520

(22) Filed: Apr. 30, 2008

(65) Prior Publication Data
US 2008/0273599 A1 Nov. 6, 2008

(30) Foreign Application Priority Data

May 2, 2007 (KR) .................. 10-2007-0042412
Mar. 21, 2008 (KR) .................. 10-2008-0026315

(51) Int. Cl.
*H04N 7/12* (2006.01)
*H04N 19/61* (2014.01)
*H04N 19/132* (2014.01)
*H04N 19/176* (2014.01)
*H04N 19/597* (2014.01)
*H04N 19/157* (2014.01)

(52) U.S. Cl.
CPC ... *H04N 19/00212* (2013.01); *H04N 19/00781* (2013.01); *H04N 19/00127* (2013.01); *H04N 19/00278* (2013.01); *H04N 19/00769* (2013.01)
USPC .................................................. 375/240.24

(58) Field of Classification Search
None
See application file for complete search history.

(56) References Cited

U.S. PATENT DOCUMENTS

| | | | |
|---|---|---|---|
| 6,037,982 A * | 3/2000 | Coelho | 348/393.1 |
| 6,693,964 B1 | 2/2004 | Zhang et al. | |
| 2002/0091695 A1 | 7/2002 | Morwood | |
| 2002/0194589 A1 * | 12/2002 | Cristofalo et al. | 725/32 |
| 2003/0039308 A1 | 2/2003 | Wu et al. | |
| 2004/0264924 A1 * | 12/2004 | Campisano et al. | 386/68 |
| 2005/0053137 A1 | 3/2005 | Holcomb | |
| 2005/0058197 A1 * | 3/2005 | Lu et al. | 375/240.03 |
| 2006/0222252 A1 * | 10/2006 | Lee | 382/239 |
| 2008/0170618 A1 | 7/2008 | Choi et al. | |
| 2008/0279284 A1 * | 11/2008 | Rodriguez et al. | 375/240.25 |
| 2010/0027682 A1 * | 2/2010 | Jeon et al. | 375/240.25 |
| 2010/0091858 A1 * | 4/2010 | Yang | 375/240.13 |
| 2012/0014449 A1 | 1/2012 | Park et al. | |

FOREIGN PATENT DOCUMENTS

| | | |
|---|---|---|
| KR | 1020070111880 A | 11/2007 |
| KR | 10-2008-0066522 A | 7/2008 |
| KR | 10-2009-0076762 A | 7/2009 |

OTHER PUBLICATIONS

Communication dated Jul. 24, 2014 issued by the Korean Intellectual Property Office in counterpart Korean Patent Application No. 10-2008-0026315.

* cited by examiner

*Primary Examiner* — Kevin C Harper
(74) *Attorney, Agent, or Firm* — Sughrue Mion, PLLC

(57) ABSTRACT

Provided are a method and apparatus for encoding and decoding multi-view video data. The method of encoding multi-view video data includes determining whether a current picture is an anchor picture; and encoding blocks of the current picture by selectively applying a skip block mode to the blocks if the current picture is the anchor picture. According to the present invention, image quality and coding efficiency may be improved.

33 Claims, 15 Drawing Sheets

FIG. 2A

METHOD AND APPARATUS FOR ENCODING AND DECODING MULTI-VIEW VIDEO DATA

CROSS-REFERENCE TO RELATED PATENT APPLICATION

This application claims the benefit of Korean Patent Application Nos. 10-2007-0042412, filed on May 2, 2007, and 10-2008-0026315, filed on Mar. 21, 2008, in the Korean Intellectual Property Office, the disclosure of which are incorporated herein in its entirety by reference.

BACKGROUND OF THE INVENTION

1. Field of the Invention

Methods and apparatuses consistent with the present invention relate to a multi-view video coding (MVC), and more particularly, to an MVC method and MVC apparatus by which a general coding efficiency is improved by improving image quality of anchor pictures.

2. Description of the Related Art

A multi-view video coding (MVC) standard improves coding performance on the basis of a conventional international video coding standard such as a Moving Picture Expert Group-4 (MPEG-4) part 10 advanced video coding (AVC; H.264) standard. A joint scalable video coding (JSVC) standard improves coding efficiency by coding hierarchical bidirectional (B)-pictures in order to support temporal scalability, and performing an inter-view prediction.

SUMMARY OF THE INVENTION

The present invention provides a multi-view video coding (MVC) method and MVC apparatus by which image quality and coding efficiency are improved by selectively allowing application of a skip block mode to anchor pictures.

According to an aspect of the present invention, there is provided a method of encoding multi-view video data, the method including determining whether a current picture is an anchor picture; and encoding blocks of the current picture by not applying a skip block mode to the blocks if the current picture is the anchor picture, wherein encoding of a block to which the skip block mode is applied is skipped.

If the skip block mode is applied to a current block, the current block may be restored by using image data of a block of a reference picture, which is disposed at the same position as the current block, or by using the image data of a block corresponding to motion information that is obtained on the basis of the motion information of neighboring blocks of the current block.

It may be determined whether to allow the application of the skip block mode, on the basis of a picture type of the current picture, and the application of the skip block mode may not be allowed if the picture type is a P type.

The skip block mode may be applied to a Moving Picture Expert Group-4 (MPEG-4) standard, an H.264 standard, or a multi-view video coding (MVC) standard.

It may be determined whether to allow the application of the skip block mode, on the basis of at least one of a current input picture, a reference picture, a quantization parameter, and external input information.

According to another aspect of the present invention, there is provided a method of encoding multi-view video data, the method including determining whether to allow application of a skip block mode when a current picture is encoded, if the current picture is an anchor picture; and selectively applying the skip block mode to blocks of the current picture when the current picture is encoded, in accordance with a determination result, wherein encoding of a block to which the skip block mode is applied is skipped.

According to another aspect of the present invention, there is provided an apparatus for encoding multi-view video data, the apparatus including an anchor picture determination unit for determining whether a current picture is an anchor picture; and an encoding unit for encoding blocks of the current picture by not applying a skip block mode to the blocks if the current picture is the anchor picture, wherein the encoding unit skips encoding of a block to which the skip block mode is applied.

If the skip block mode is applied to a current block, the current block may be restored by using image data of a block of a reference picture, which is disposed at the same position as the current block, or by using the image data of a block corresponding to motion information that is obtained on the basis of the motion information of neighboring blocks of the current block.

According to another aspect of the present invention, there is provided an apparatus for encoding multi-view video data, the apparatus including a skip block mode allowance determination unit for determining whether to allow application of a skip block mode when a current picture is encoded, if the current picture is an anchor picture; and an encoding unit for selectively applying the skip block mode to blocks of the current picture when the current picture is encoded, in accordance with a determination result, wherein the encoding unit skips encoding of a block to which the skip block mode is applied.

According to another aspect of the present invention, there is provided a method of decoding multi-view video data, the method including determining whether a current picture is an anchor picture; and decoding blocks of the current picture by not applying a skip block mode to the blocks if the current picture is the anchor picture, wherein decoding of a block to which the skip block mode is applied is skipped.

According to another aspect of the present invention, there is provided a method of decoding multi-view video data, the method including determining whether to allow application of a skip block mode when a current picture is decoded, if the current picture is an anchor picture; and selectively applying the skip block mode to blocks of the current picture when the current picture is decoded, in accordance with a determination result, wherein decoding of a block to which the skip block mode is applied is skipped.

According to another aspect of the present invention, there is provided an apparatus for decoding multi-view video data, the apparatus including an anchor picture determination unit for determining whether a current picture is an anchor picture; and a decoding unit for decoding blocks of the current picture by not applying a skip block mode to the blocks if the current picture is the anchor picture, wherein the decoding unit skips decoding of a block to which the skip block mode is applied.

According to another aspect of the present invention, there is provided an apparatus for decoding multi-view video data, the apparatus including a skip block mode allowance determination unit for determining whether to allow application of a skip block mode when a current picture is decoded, if the current picture is an anchor picture; and a decoding unit for selectively applying the skip block mode to blocks of the current picture when the current picture is decoded, in accordance with a determination result, wherein the decoding unit skips decoding of a block to which the skip block mode is applied.

According to another aspect of the present invention, there is provided a computer readable recording medium having recorded thereon a computer program for executing a method of encoding multi-view video data, the method including determining whether a current picture is an anchor picture; and encoding blocks of the current picture by not applying a skip block mode to the blocks if the current picture is the anchor picture, wherein encoding of a block to which the skip block mode is applied is skipped.

According to another aspect of the present invention, there is provided a computer readable recording medium having recorded thereon a computer program for executing a method of encoding multi-view video data, the method including determining whether to allow application of a skip block mode when a current picture is encoded, if the current picture is an anchor picture; and selectively applying the skip block mode to blocks of the current picture when the current picture is encoded, in accordance with a determination result, wherein encoding of a block to which the skip block mode is applied is skipped.

According to another aspect of the present invention, there is provided a computer readable recording medium having recorded thereon a computer program for executing a method of decoding multi-view video data, the method including determining whether a current picture is an anchor picture; and decoding blocks of the current picture by not applying a skip block mode to the blocks if the current picture is the anchor picture, wherein decoding of a block to which the skip block mode is applied is skipped.

According to another aspect of the present invention, there is provided a computer readable recording medium having recorded thereon a computer program for executing a method of decoding multi-view video data, the method including determining whether to allow application of a skip block mode when a current picture is decoded, if the current picture is an anchor picture; and selectively applying the skip block mode to blocks of the current picture when the current picture is decoded, in accordance with a determination result, wherein decoding of a block to which the skip block mode is applied is skipped.

BRIEF DESCRIPTION OF THE DRAWINGS

The above and other features of the present invention will become more apparent by describing in detail exemplary embodiments thereof with reference to the attached drawings in which:

FIGS. 2A through 2F are diagrams showing influences of image quality of anchor pictures on a general coding efficiency;

DETAILED DESCRIPTION OF THE INVENTION

Hereinafter, the present invention will be described in detail by explaining embodiments of the invention with reference to the attached drawings.

Figure 1:
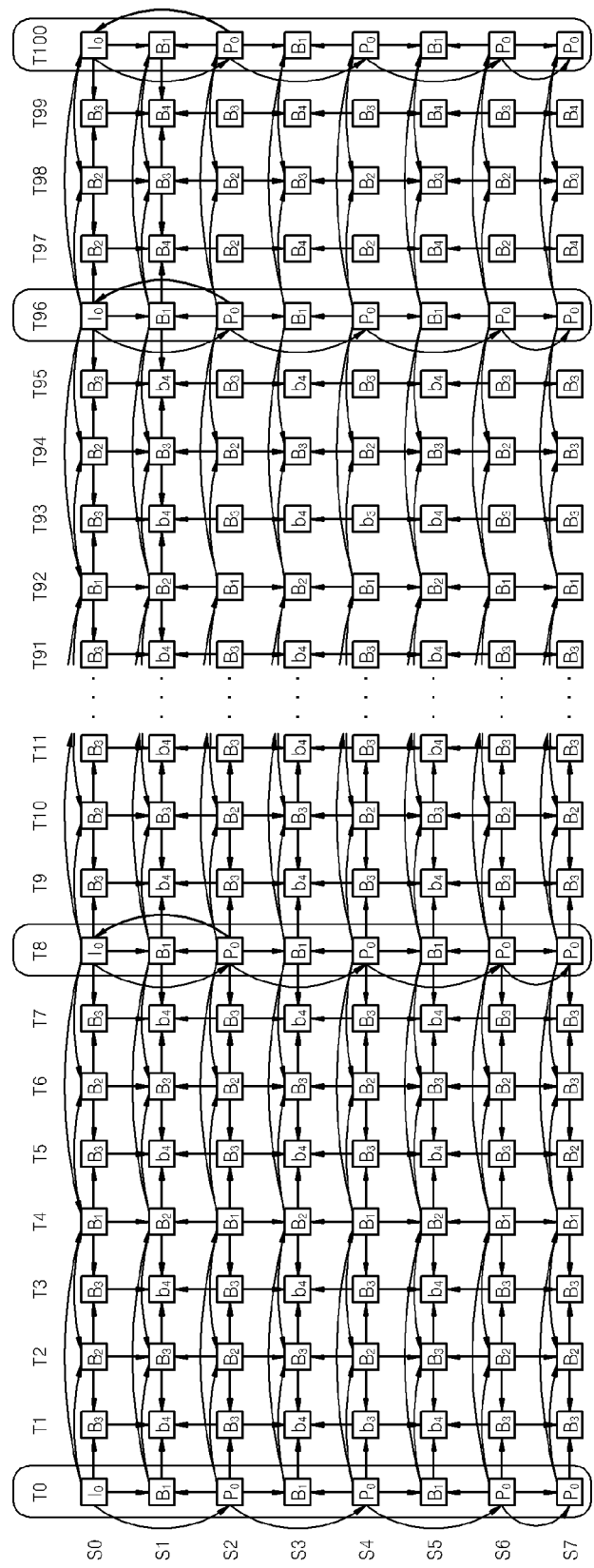
FIG. 1 is a diagram illustrating a prediction structure of a multi-view video coding (MVC) standard.

FIG. 1 is a diagram illustrating a prediction structure of a multi-view video coding (MVC) standard if eight views exist, for example, if the size of a group of pictures (GOP) in a temporal direction is eight. Here, each of S0, S1, S2, S3, S4, S5, S6, and S7 represents a view and each of T0, T1, T2, T3, . . . , T 100 represents a temporal point.

Referring to FIG. 1, when pictures in each view are coded in the temporal direction, prediction is performed by using a hierarchical bidirectional (B)-picture structure. Pictures at a first temporal point such as temporal point T0, multiple Nth (N=8) temporal points such as temporal points T8, T16, T24, . . . , and a last temporal point such as temporal point T100 are referred to as anchor pictures.

The anchor pictures perform the prediction only in a view direction. For example, at the same temporal point, view S2 performs the prediction from view S0, view S1 performs the prediction from views S0 and S2, view S4 performs the prediction from view S0, view S3 performs the prediction from views S2 and S4, view S6 performs the prediction from view S4, view S5 performs the prediction from views S4 and S6, and view S7 that is a last view, performs the prediction from view S6.

Basically, non-anchor pictures perform the prediction in the temporal direction. In FIG. 1, every second view such as views S1, S3, S5, and S7 also perform the prediction from neighboring views. For example, view S1 performs the prediction from views S0 and S2, view S3 performs the prediction from views S1 and S4, and view S5 performs the prediction from views S3 and S6.

An anchor picture is a basic picture to be referred to by a non-anchor picture and influences the prediction of another anchor picture. Thus, image quality of the anchor picture influences the image quality of pictures referring to the anchor picture and also continuously influences on prediction efficiency. If the anchor picture has a bad image quality, the bad image quality continuously influences on the prediction and thus a general image quality deteriorates.

Influences of image quality of anchor pictures on a general coding efficiency will now be described with reference to FIGS. 2A through 2F.

FIGS. 2A through 2F are diagrams showing influences of image quality of anchor pictures on a general coding efficiency.

Figure 2A:
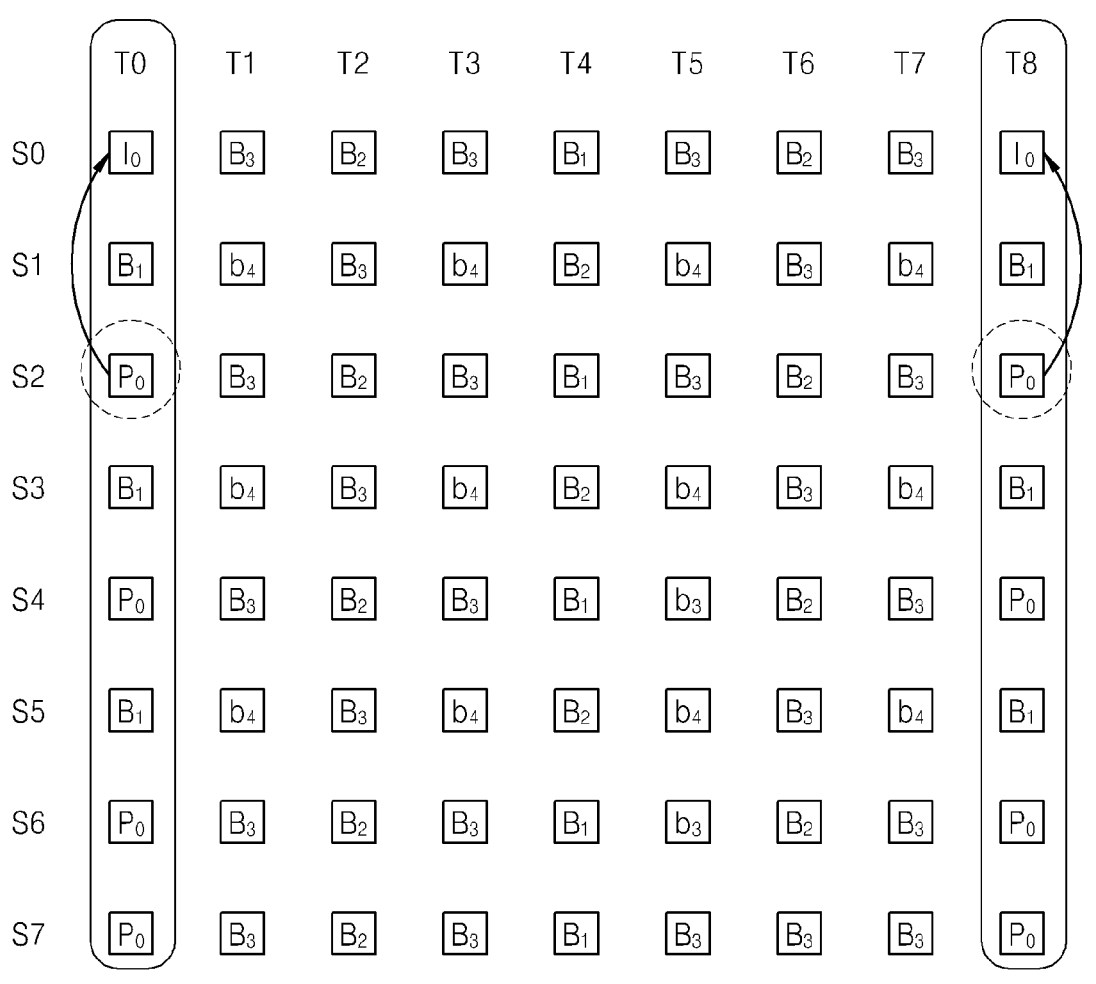

Referring to FIG. 2A, an anchor picture T0/S2(P0) that is a predictive (P) picture at temporal point T0 in view S2, and an anchor picture T8/S2(P0) that is a P picture at temporal point T8 in view S2 influence all pictures in a GOP, except for an anchor picture T0/S0(I0) that is referred to by the anchor pictures T0/S2(P0) and T8/S2(P0). Thus, if the image quality of the anchor pictures T0/S2(P0) and T8/S2(P0) deteriorates, the deteriorated image quality influences on all pictures in the GOP and thus will greatly influence prediction efficiency and coding performance of a whole sequence.

Influence of the deteriorated image quality of the anchor pictures T0/S2(P0) and T8/S2(P0) on other anchor pictures and non-anchor pictures will now be described with reference to FIGS. 2B through 2F.

Figure 2B:
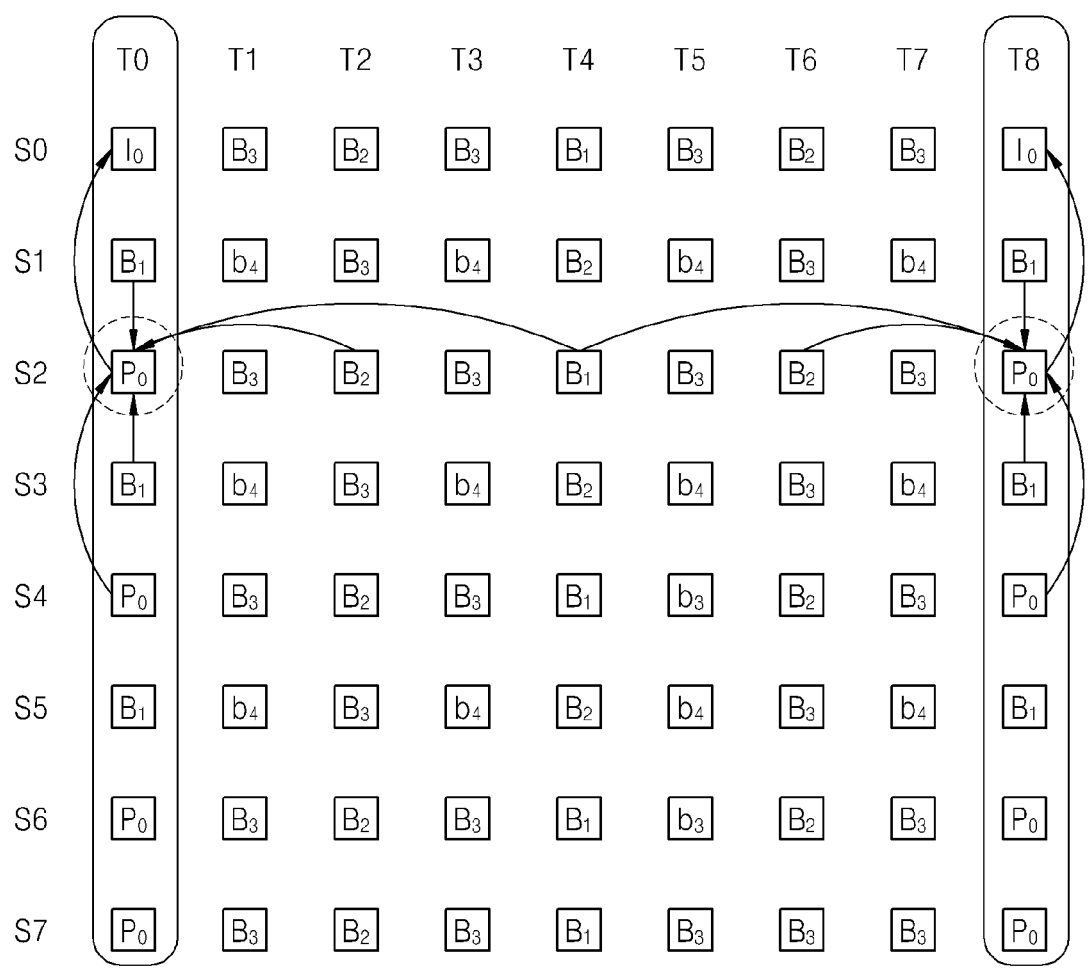

Referring to FIG. 2B, if the image quality of the anchor pictures T0/S2(P0) and T8/S2(P0) deteriorates, the prediction efficiency of anchor pictures T0/S1(B1), T0/S3(B1), T0/S4(P0), T8/S1(B1), T8/S3(B1), and T8/S4(P0) directly referring to the anchor pictures T0/S2(P0) and T8/S2(P0), is reduced and thus image quality deterioration occurs.

Figure 2C:
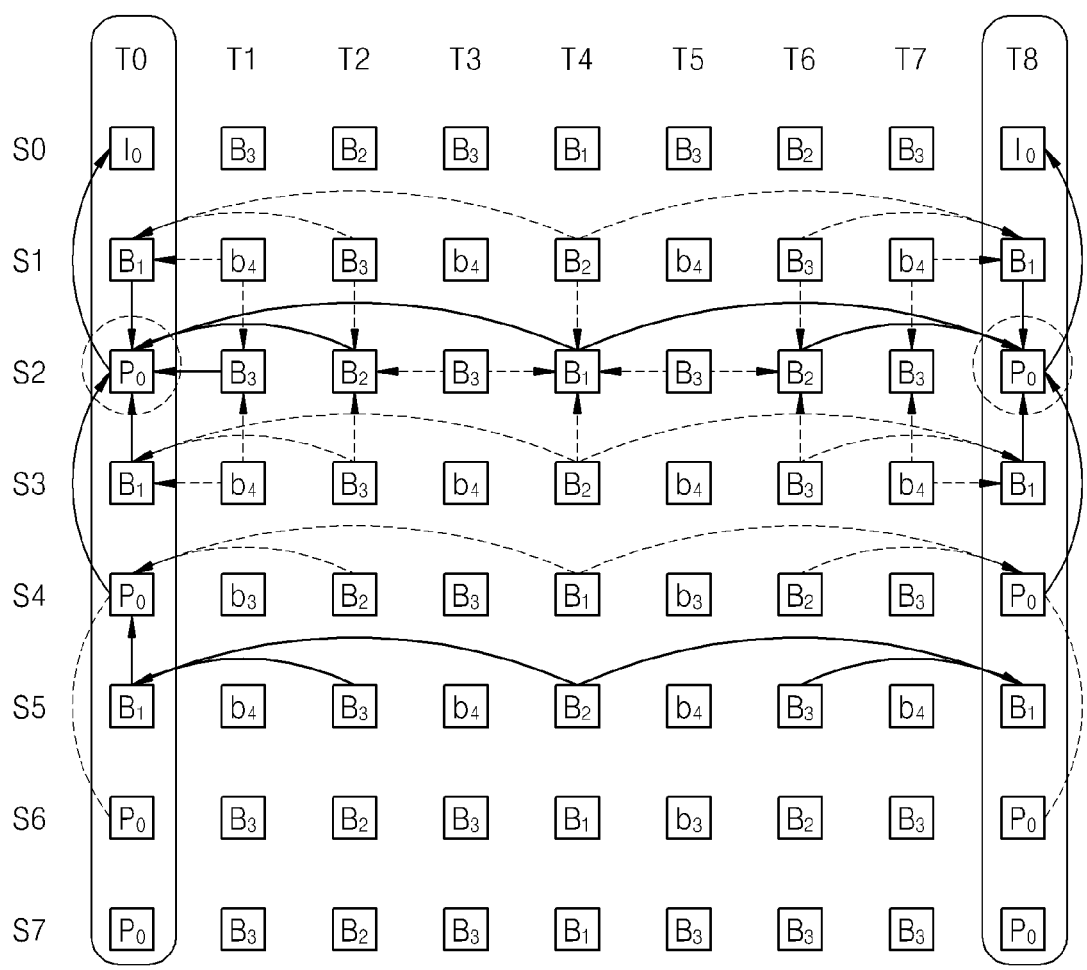

Referring to FIG. 2C, the prediction efficiency of anchor pictures T0/S5(B1), T0/S6(P0), T8/S5(B1), and T8/S6(P0) referring to the anchor pictures T0/S4(P0) and T8/S4(P0) which have a further deteriorated image quality by their reference to the anchor pictures T0/S2(P0) and T8/S2(P0) having the deteriorated image quality, is further reduced and thus the image quality deterioration occurs.

Figure 2D:
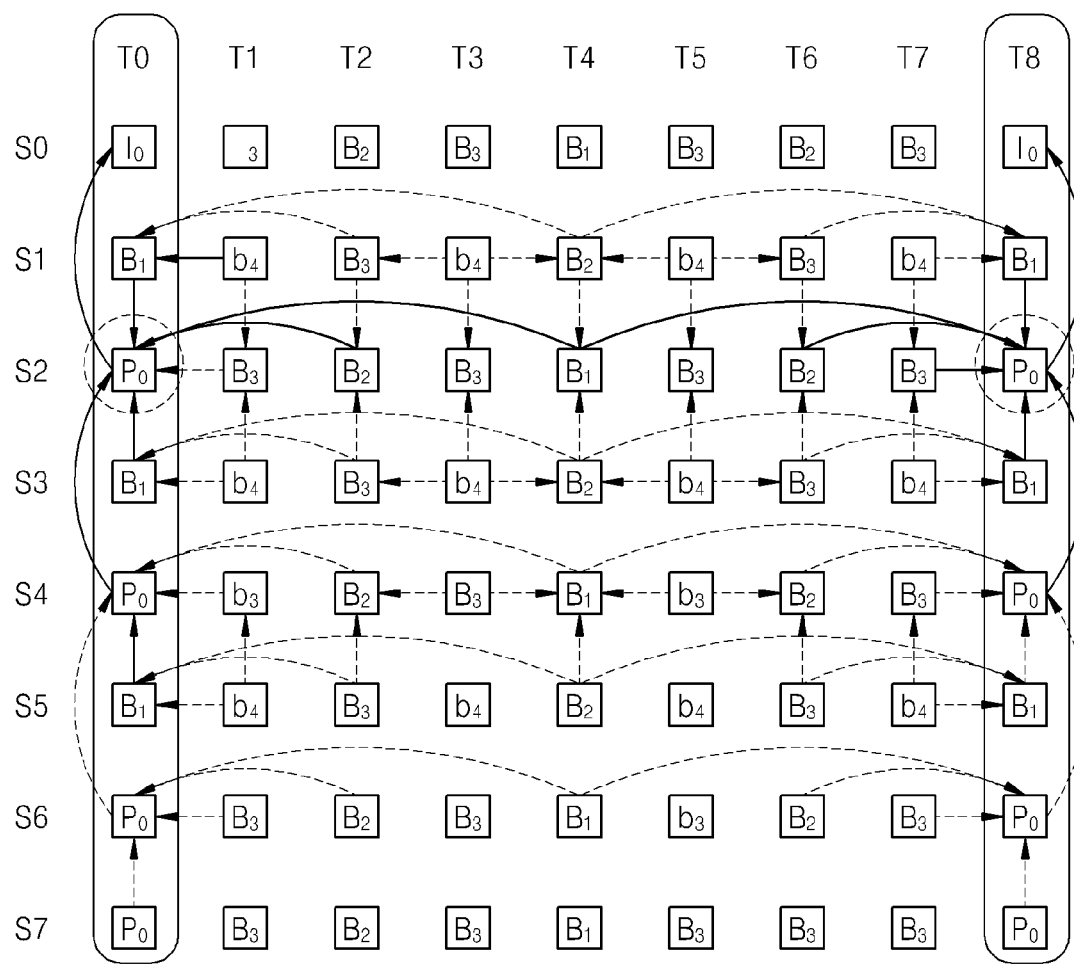

As such, the prediction efficiency is continuously reduced. Referring to FIG. 2D, the prediction efficiency of anchor pictures T0/S7(P0) and T8/S7(P0) referring to the anchor pictures T0/S6(P0) and T8/S6(P0) which has a further deteriorated image quality due to the reduced prediction efficiency, is further reduced and thus the image quality continuously deteriorates.

Figure 2E:
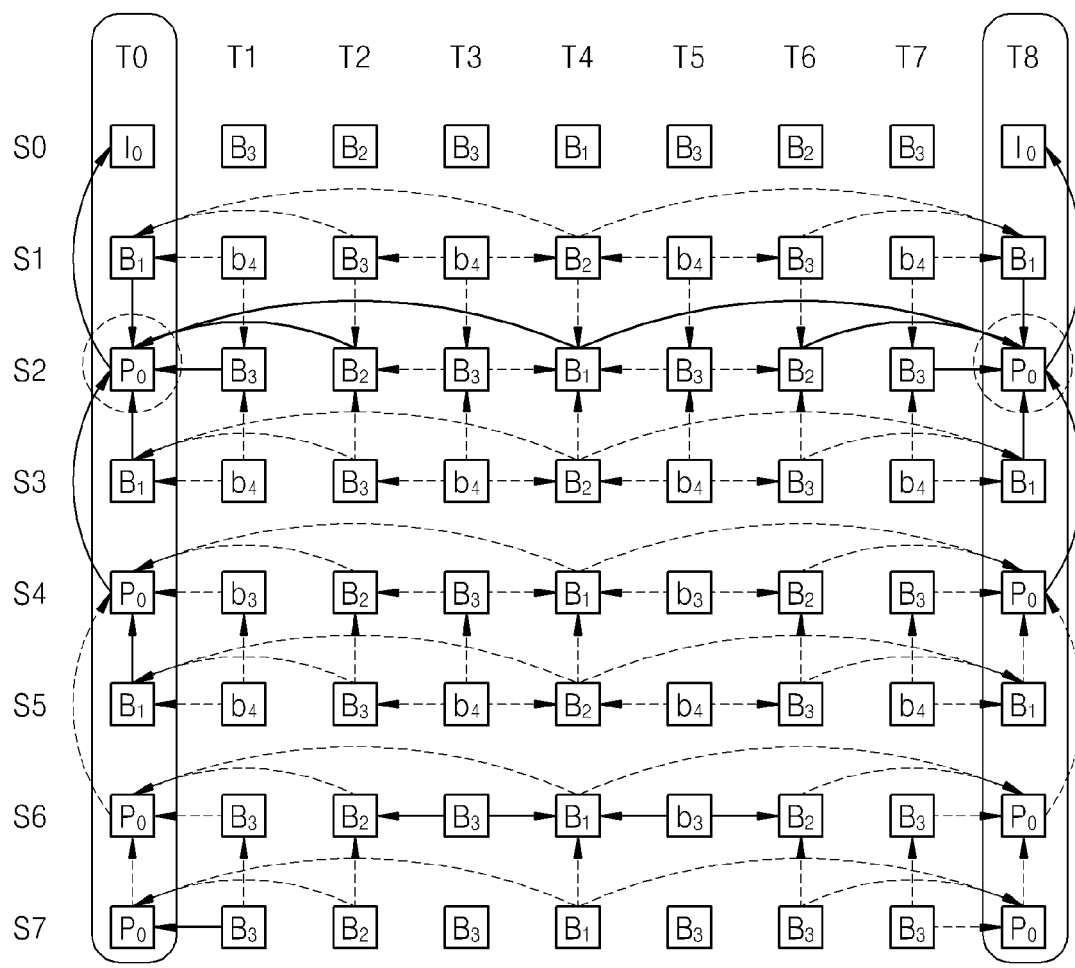
Figure 2F:
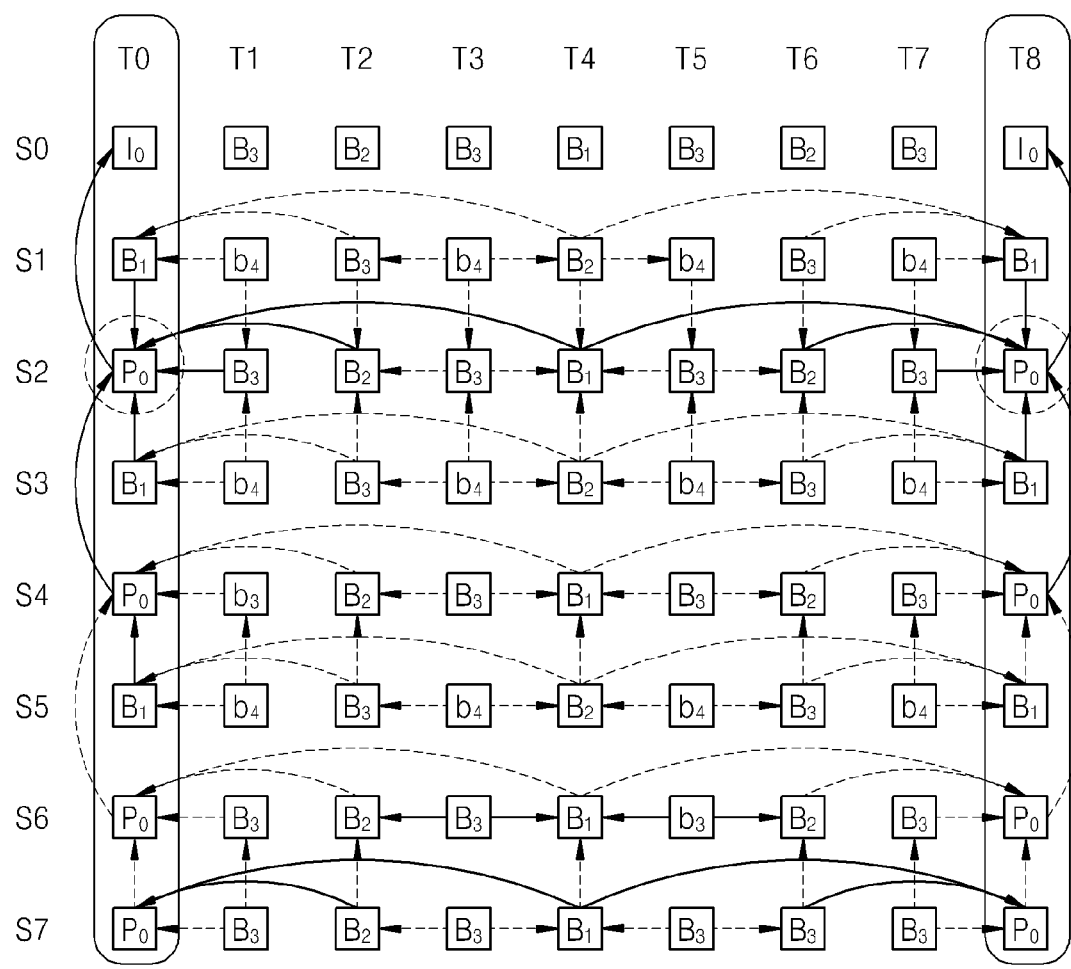

Referring to FIGS. 2E and 2F, when the image quality of anchor pictures deteriorates, the image quality of the non-anchor pictures which basically perform prediction by referring to the anchor pictures, also continuously deteriorates.

For example, when non-anchor pictures in view S2 perform the prediction, the prediction efficiency of a picture T4/S2(B1) at temporal point T4 in view S2 which refers to the anchor pictures T0/S2(P0) and T8/S2(P0) having the deteriorated image quality, is reduced and thus the image quality deterioration occurs. Also, the prediction efficiency of pictures T2/S2(B2) and T6/S2(B2) which refer to the anchor pictures T0/S2(P0) and T8/S2(P0) and the picture T4/S2(B1) having the deteriorated image quality, will be further reduced. Furthermore, the prediction efficiency of other pictures T1/S2(B3), T3/S2(B3), T5/S2(B3), and T7/S2(B3) will be further reduced.

As described above, according to an MVC standard, image quality of an anchor picture greatly influences on other pictures in the same GOP and thus a general coding efficiency of a video sequence is greatly affected.

In a typical video coding method such as an H.264 method, a skip block mode is included in block modes which are used when an inter-frame prediction is performed. In the skip block mode, a current block is restored by using a block of a reference frame, which is disposed at the same position as the current block, or by using a block corresponding to a motion vector that is obtained on the basis of the motion vectors of neighboring blocks of the current block, and thus data of the current block, including a residual image, is not coded.

For example, in the skip block mode according to a Moving Picture Expert Group-4 (MPEG-4) standard, information of a macroblock is not coded at all and a pixel which is disposed at the same position as the macroblock, that is, of which a motion vector corresponds to zero, is used as an encoding image.

Meanwhile, in the skip block mode according to an H.264/ advanced video coding (AVC) standard, a motion vector is predicted, a prediction signal is generated by performing motion compensation on the basis of the motion vector, and the prediction signal is used as an encoding image.

As described above, in the skip block mode, image data of a current block is not coded in an encoding operation and the current block is restored by using the image data of a block of a reference picture, which is disposed at the same position as the current block, or by using the image data of a block corresponding to motion information that is obtained on the basis of the motion information of neighboring blocks of the current block, in a decoding operation.

Thus, if the skip block mode is applied to an anchor picture, inter-view level differences of luminance signals and chrominance signals are included in residual images and are not coded. Accordingly, image quality deterioration may occur in anchor pictures in the skip block mode and the image quality deterioration may be propagated to other pictures which refer to these anchor pictures.

In an illumination compensation (IC) method according to the MVC standard, compensation may be performed by predicting an IC offset from neighboring blocks. However, if the neighboring blocks do not have IC offsets, the image quality deterioration occurs in a block to which the skip block mode is applied when the block is encoded.

Also, subjectively, although the IC method is performed on the block to which the skip block mode is applied, a compensation value of a chrominance signal does not exist. Thus, the image quality deterioration may greatly occur.

For example, when a Race1 quarter video graphics array (QVGA) 30 Hz video sequence is coded by using MVC software Joint Multiview Video Model (JMVM) ver.2.3, if the IC method according to the MVC standard is performed on an anchor picture of a second view and the anchor picture is decoded by using a quantization parameter of a value 37, great differences or blocking artifacts occur between a block to which the skip block mode is applied, and neighboring blocks of the block.

The above-described image quality deterioration may be clearly shown when Y, U, and V components of the decoded picture are compared each other. Due to the image quality deterioration, prediction efficiency of pictures which perform prediction coding by referring to pictures to which the skip block mode is applied, is reduced.

Also, in the Race1 QVGA 30 Hz video sequence, if the prediction coding is performed on an anchor picture of a fourth view by referring to the anchor picture of the second view, the image quality deterioration of the anchor picture of the second view is propagated to the anchor picture of the fourth view.

As such, because an anchor picture is referred by other pictures, if image quality deterioration occurs in the anchor picture, coding efficiency of a whole sequence to be currently coded, is reduced.

In the present invention, when MVC is performed, application of a skip block mode to an anchor picture is selectively allowed in order to improve a subjective image quality and a general coding efficiency by removing or minimizing image quality deterioration occurring in anchor pictures and by improving prediction efficiency of pictures referring to the anchor pictures.

According to an embodiment of the present invention, when a current picture is encoded, if the current picture is an anchor picture, application of a skip block mode to the current picture is not allowed.

According to another embodiment of the present invention, when a current picture is encoded, if the current picture is an anchor picture, application of a skip block mode to the current picture is selectively allowed in accordance with a picture type of the current picture.

According to another embodiment of the present invention, application of a skip block mode to a current picture is flexibly allowed and data indicating whether information regarding the skip block mode is coded is transmitted by using a flag.

Figure 3:
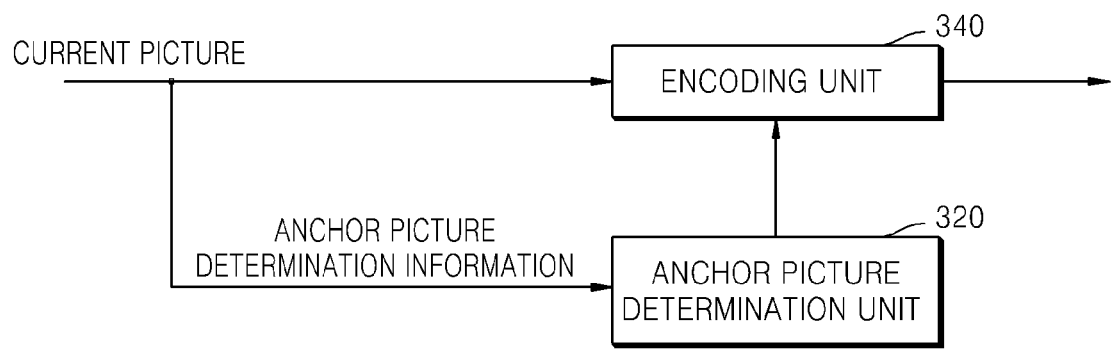
FIG. 3 is a block diagram of a multi-view video encoding apparatus according to an embodiment of the present invention.

FIG. 3 is a block diagram of a multi-view video encoding apparatus according to an embodiment of the present invention.

Referring to FIG. 3, the multi-view video encoding apparatus according to the current embodiment of the present invention includes an anchor picture determination unit 320 and an encoding unit 340.

The anchor picture determination unit 320 determines whether a current picture is an anchor picture by using anchor picture determination information of the current picture, such as header information. If the current picture is the anchor picture, the anchor picture determination unit 320 transmits a control signal indicating not to apply a skip block mode to blocks of the current picture, to the encoding unit 340.

If the control signal indicating not to apply the skip block mode is received from the anchor picture determination unit 320, the encoding unit 340 encodes the current picture by not applying the skip block mode to the blocks of the current picture. If the control signal indicating not to apply the skip block mode is not received or if a control signal indicating to allow application of the skip block mode is received from the anchor picture determination unit 320, the encoding unit 340 encodes the current picture by selectively applying the skip block mode to the blocks of the current picture. For example, when the current picture is encoded, encoding of image data of the current picture is skipped. When the current picture is decoded, a current block is restored by using the image data of a block of a reference picture, which is disposed at the same position as the current block, or by using the image data of a block corresponding to motion information that is obtained on the basis of the motion information of neighboring blocks of the current block.

Only information on the reference picture to be used to restore the current picture is encoded. A conventional image encoder supporting the skip block mode may be used as the encoding unit 340. If the skip block mode is selectively applied to the blocks of the current picture, the encoding unit 340 encodes and outputs information indicating that the skip block mode is selectively applied.

If the skip block mode is not applied to the blocks of the current picture, the encoding unit 340 encodes and outputs information indicating that the skip block mode is not applied. However, selectively, if the current picture is the anchor picture, information indicating whether the skip block mode is applied to the blocks of the current picture, such as a syntax element, may not be coded, that is, may not be included in a bitstream.

For example, in order to indicate that the skip block mode is selectively applied, according to an MVC standard, "mb_skip_flag" indicating whether the skip block mode is applied to the current block is coded in a context-based adaptive binary arithmetic coding (CABAC) method, and "mb_skip_run" indicating the number of sequential skip blocks is coded in a context-based adaptive variable length coding (CAVLC) method.

Thus, if the current picture is the anchor picture, in order to indicate that the skip block mode is not applied, according to the MVC standard, "mb_skip_flag" is not coded in the CABAC method, and "mb_skip run" is not coded in the CAVLC method.

Table 1 shows an example when slice data syntax according to an MVC standard is modified so that the multi-view video encoding apparatus illustrated in FIG. 3 is implemented, according to an embodiment of the present invention.

TABLE 1

| slice_data( ) { | C | Descriptor |
|---|---|---|
| if( entropy_coding_mode_flag ) | | |
|   while( !byte_aligned( ) ) | | |
|     cabac_alignment_one_bit | 2 | f(1) |
| CurrMbAddr = first_mb_in_slice * | | |
| (1 + MbaffFrameFlag ) | | |
| moreData Flag = 1 | | |
| prevMbSkipped = 0 | | |
| do { | | |
|   if( slice_type != I && slice_type != SI ) | | |
|     if( !anchor_pic_flag) { | | |
|       if( !entropy_coding_mode_flag) { | | |
|         mb_skip_run | 2 | ue(v) |
|         prevMbSkipped = ( mb_skip_run > 0 ) | | |
|         for( i=0; i<mb_skip_run; i++ ) | | |
|           CurrMbAddr = NextMbAddress( | | |
|           CurrMbAddr ) | | |
|         moreDataFlag = more_rbsp_data( ) | | |
|       } else { | | |
|         mb_skip_flag | 2 | ae(v) |
|         moreDataFlag = !mb_skip_flag | | |
|       } | | |
|     } | | |
|   if( moreDataFlag) { | | |
|     if( MbaffFrameFlag && ( CurrMbAddr % 2 == | | |
|     0 || ( CurrMbAddr % 2 == 1 && | | |
|     prevMbSkipped)) ) | | |
|       mb_field_decoding_flag | 2 | u(1)\|ae(v) |
|       macroblock_layer( ) | 2\|3\|4 | |
|   } | | |
|   if( !entropy_coding_mode_flag ) | | |
|     moreDataFlag = more_rbsp_data( ) | | |
|   else { | | |
|     if( slice_type != I && slice_type != SI ) | | |
|       prevMbSkipped = mb_skip_flag | | |
|     if( MbaffFrameFlag && CurrMbAddr | | |
|     % 2 == 0 ) | | |
|       moreData Flag = 1 | | |
|     else { | | |
|       end_of slice_flag | 2 | ae(v) |
|       moreDataFlag = !end_of_slice_flag | | |
|     } | | |
|   } | | |
|   CurrMbAddr = NextMbAddress( CurrMbAddr ) | | |
| } while( moreDataFlag ) | | |
| } | | |

In table 1, 'anchor_pic_flag' is information included in a network abstraction layer (NAL) unit of a current slice and indicates whether a current picture is an anchor picture. For example, if the current picture is the anchor picture, 'anchor_pic_flag=1'.

That is, according to the current embodiment of the present invention, if the current picture is the anchor picture, encoding of the current picture is skipped and the skip block mode is not applied to blocks of the current picture. Thus, if the current picture is the anchor picture, "mb_skip_flag☐and "mb_skip run☐indicating whether the skip block mode is applied, may not be coded. This is because a decoder may also determine that the skip block mode is not applied to the blocks of the current picture if the current picture is the anchor picture.

Meanwhile, a separate flag which is compatible with a conventional MVC standard and indicates whether the skip block mode is applied to a current block, may also be used.

Figure 4:
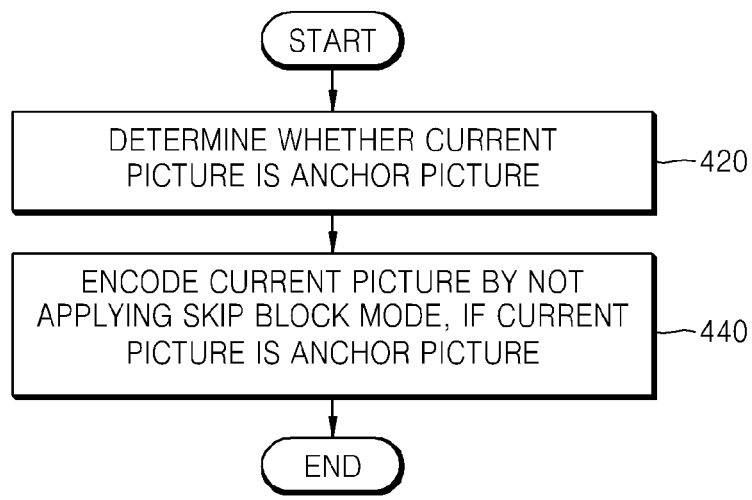
FIG. 4 is a flowchart of an encoding method performed by the multi-view video encoding apparatus illustrated in FIG. 3, according to an embodiment of the present invention.

FIG. 4 is a flowchart of an encoding method performed by the multi-view video encoding apparatus illustrated in FIG. 3, according to an embodiment of the present invention.

According to the current embodiment of the present invention, in order to control whether to apply a skip block mode to blocks of an anchor picture, if a current picture is the anchor picture, application of the skip block mode to the current picture is not allowed.

Referring to FIG. 4, in operation 420, it is determined whether the current picture is the anchor picture. For example, it is determined whether the current picture is the anchor picture, on the basis of header information of an input picture.

In operation 440, if the current picture is the anchor picture, when the current picture is encoded, the skip block mode is not applied to the blocks of the current picture. Meanwhile, if the current picture is not the anchor picture, a conventional image encoding process is performed on the current picture and the application of the skip block mode is allowed.

Figure 5:
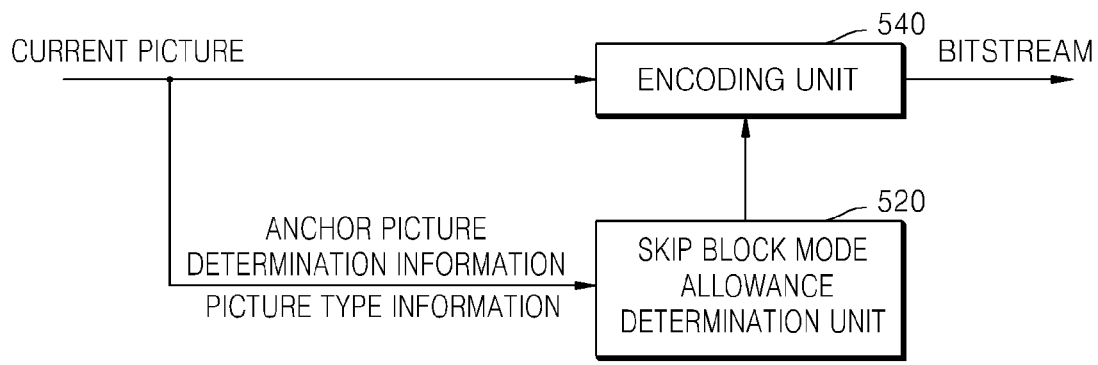
FIG. 5 is a block diagram of a multi-view video encoding apparatus according to another embodiment of the present invention.

FIG. 5 is a block diagram of a multi-view video encoding apparatus according to another embodiment of the present invention.

Referring to FIG. 5, the multi-view video encoding apparatus according to the current embodiment of the present invention includes a skip block mode allowance determination unit 520 and an encoding unit 540.

The skip block mode allowance determination unit 520 receives anchor picture determination information and picture type information, and determines whether to allow application of a skip block mode to a current picture. For example, the skip block mode allowance determination unit 520 determines whether the current picture is the anchor picture by using header information of an input picture and determines whether to apply the skip block mode to blocks of the current picture in accordance with the picture type information of the current picture. For example, if the current picture is the anchor picture and a P picture, the application of the skip block mode to the current picture is not allowed. However, if the current picture is the anchor picture and a B picture, the application of the skip block mode to the current picture is allowed.

If the application of the skip block mode is not allowed, a residual image and prediction information is coded, and thus the amount of bits is relatively large in comparison to a case when the application of the skip block mode is allowed. Accordingly, if the application of the skip block mode to all anchor pictures is not allowed, the amount of bit may greatly increase.

Thus, as described above with reference to FIG. 1, the application of the skip block mode to a P picture that continuously influences on prediction of other anchor pictures is not allowed and the application of the skip block mode to a B picture that does not influence on the prediction of the other anchor pictures is allowed.

Also, as described above with reference to FIG. 1, for example, view S1 performs the prediction from views S0 and S2 at the same temporal point. Thus, although the application of the skip block mode to the B picture is allowed, image quality deterioration is not serious.

If the current picture is the anchor picture and the P picture, the skip block mode allowance determination unit 520 transmits a control signal indicating not to apply the skip block mode to the blocks of the current picture, to the encoding unit 540.

If the control signal indicating not to apply the skip block mode is received from the skip block mode allowance determination unit 520, the encoding unit 540 encodes the current picture by not applying the skip block mode to the blocks of the current picture. If the control signal indicating not to apply the skip block mode is not received or if a control signal indicating to allow the application of the skip block mode is received from the skip block mode allowance determination unit 520, the encoding unit 540 selectively applies the skip block mode to the blocks of the current picture.

A conventional image encoder supporting the skip block mode may be used as the encoding unit 540. If the skip block mode is selectively applied to the blocks of the current picture, the encoding unit 540 encodes and outputs information indicating that the skip block mode is selectively applied.

If the skip block mode is not applied to the blocks of the current picture, the encoding unit 540 encodes and outputs information indicating that the skip block mode is not applied. However, selectively, if the current picture is the anchor picture and the P picture, information indicating whether the skip block mode is applied to the blocks of the current picture, such as a syntax element, may not be coded, that is, may not be included in a bitstream.

Table 2 shows an example when slice data syntax according to an MVC standard is modified so that the multi-view video encoding apparatus illustrated in FIG. 5 is implemented, according to an embodiment of the present invention.

TABLE 2

| slice_data( ) { | C | Descriptor |
|---|---|---|
| if( entropy_coding_mode_flag ) | | |
|   while( !byte_aligned( ) ) | | |
|     cabac_alignment_one_bit | 2 | f(1) |
| CurrMbAddr = first_mb_in_slice * | | |
| (1 + MbaffFrameFlag ) | | |
| moreDataFlag = 1 | | |
| prevMbSkipped = 0 | | |
| do { | | |
|   if( slice_type != I && slice type != SI ) | | |
|     if( !anchor_pic_flag && slice_type != P) { | | |
|       if( !entropy_coding_mode_flag) { | | |
|         mb_skip_run | 2 | ue(v) |
|         prevMbSkipped = (mb_skip_run > 0 ) | | |
|         for( i=0; i<mb_skip_run; i++ ) | | |
|           CurrMbAddr = NextMbAddress( | | |
|           CurrMbAddr ) | | |
|         moreDataFlag = more_rbsp_data( ) | | |
|     } else { | | |
|       mb_skip_flag | 2 | ae(v) |
|       moreDataFlag = !mb_skip_flag | | |
|     } | | |
|   } | | |
|   if( moreDataFlag ) { | | |
|     if( MbaffFrameFlag && ( CurrMbAddr % 2 == | | |
|       0 || ( CurrMbAddr % 2 == 1 && | | |
|       prevMbSkipped)) ) | | |
|       mb_field_decoding_flag | 2 | u(1)\|ae(v) |
|     macroblock_layer( ) | 2\|3\|4 | |
| } | | |
| if( !entropy_coding_mode_flag ) | | |
|   moreDataFlag = more_rbsp_data( ) | | |
| else { | | |
|   if( slice_type != I && slice_type != SI ) | | |
|     prevMbSkipped = mb_skip_flag | | |

TABLE 2-continued

```
slice_data( ) {                                           C   Descriptor
    if( MbaffFrameFlag  &&  CurrMbAddr
      % 2  ==  0 )
        moreDataFlag = 1
    else {
        end_of_slice_flag                                 2   ae(v)
        moreDataFlag = !end_of_slice_flag
    }
  }
  CurrMbAddr = NextMbAddress( CurrMbAddr )
} while( moreDataFlag )
}
```

Here, 'anchor_pic_flag' is information included in a NAL unit of a current slice and indicates whether a current picture is an anchor picture. For example, if the current picture is the anchor picture, 'anchor_pic_flag=1'.

If the current picture is the anchor picture and the P picture, application of a skip block mode to the current picture is not allowed and thus "mb_skip_flag" and "mb_skip_run" indicating whether the skip block mode is applied, may not be coded.

Figure 6:
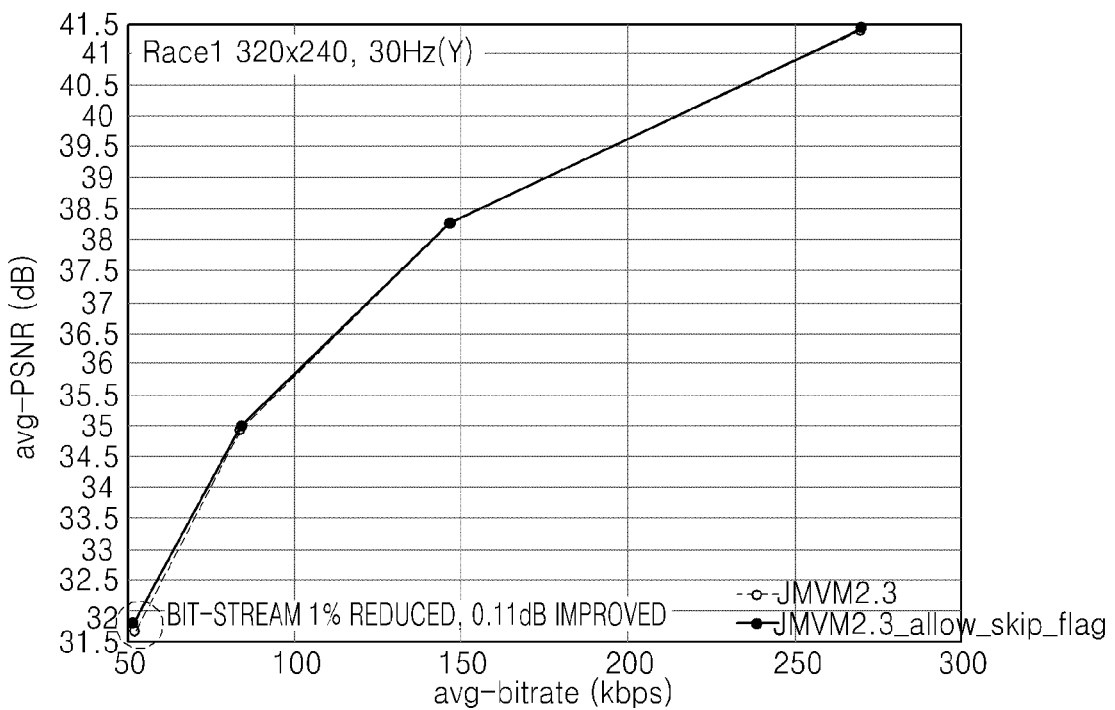
FIG. 6 is a graph showing a simulation result according to an embodiment of the present invention.
Figure 7:
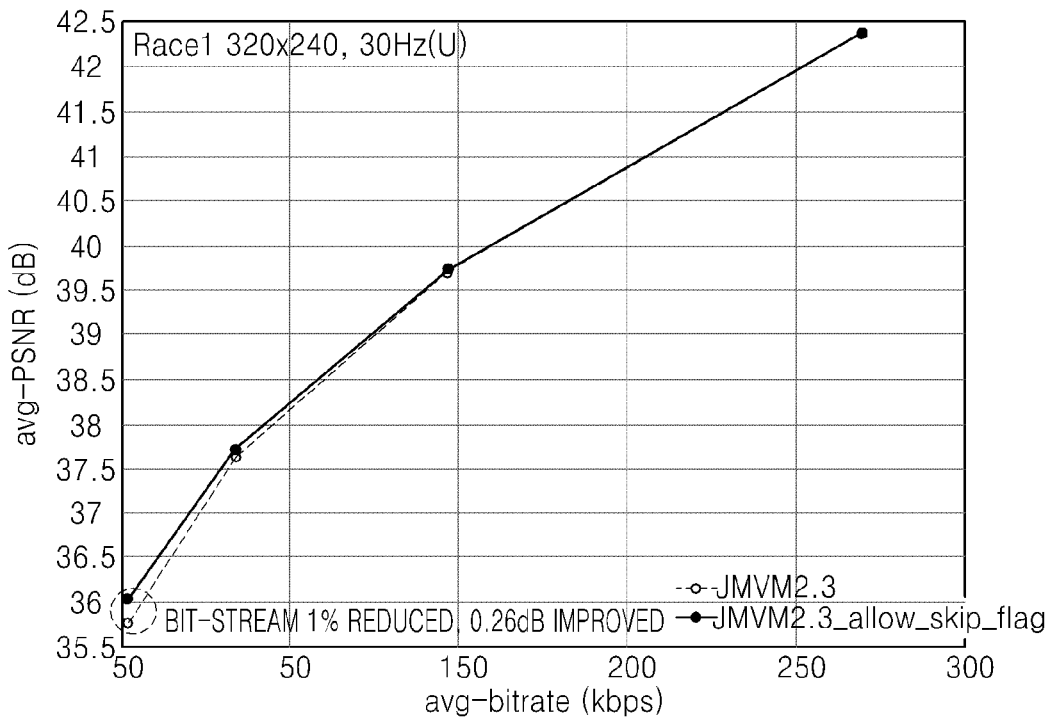
FIG. 7 is a graph showing a simulation result according to another embodiment of the present invention.
Figure 8:
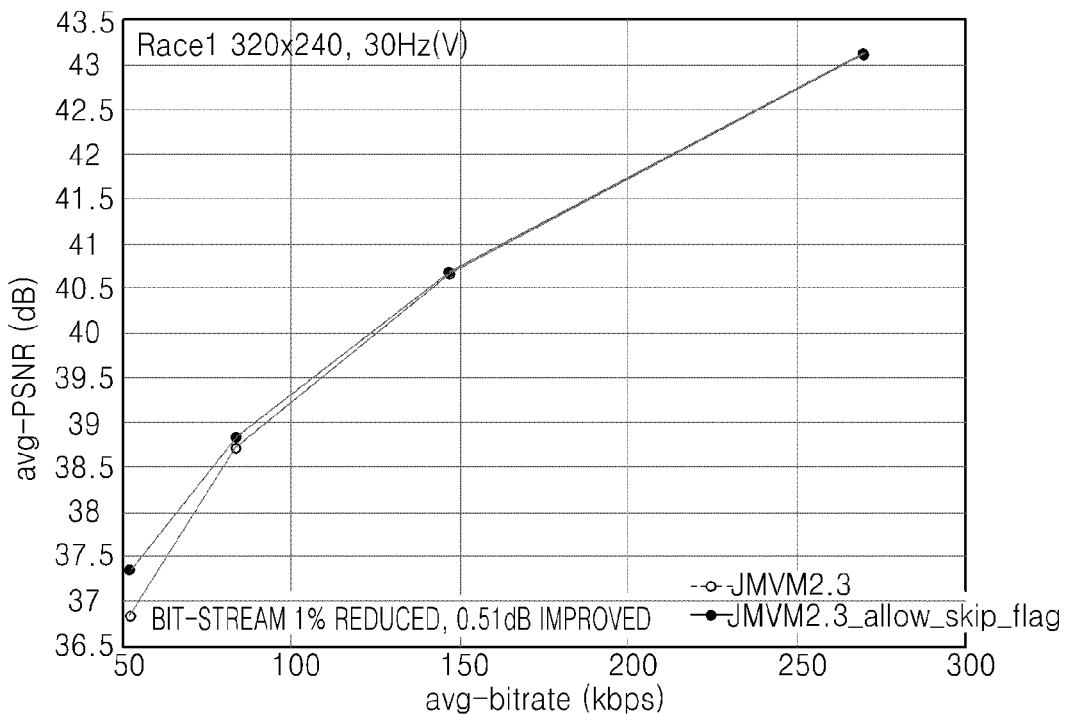
FIG. 8 is a graph showing a simulation result according to another embodiment of the present invention.

FIGS. 6 through 8 are graphs respectively showing simulation results of average bit rates versus average peak signal-to-noise ratios (PSNRs) of Y, U, and V components when a test is performed with regard to a Race1 QVGA 30 Hz video sequence that is coded by performing an IC method and by using JMVM ver.2.3 that is a reference source code according to an MVC standard, in accordance with the previous embodiment of FIG. 5.

Referring to FIGS. 6 through 8, when a skip block mode is not applied to a P anchor picture, approximately 1% of bits is reduced at a low bit rate. By not applying the skip block mode to the P anchor picture, an amount of bits of the P anchor picture is increased. However, image quality of the P anchor picture is increased and thus prediction efficiency of anchor pictures which refer to the P anchor picture is increased and the amount of bits of a whole sequence is reduced.

The average PSNRs of the Y, U, and V components of the whole sequence are respectively improved 0.11 dB, 0.25 dB, and 0.51 dB, at the low bit rate. At other bit rates, the average PSNRs of the Y, U, and V components are improved a little or the same compared to a case when the skip block mode is applied.

Figure 9:
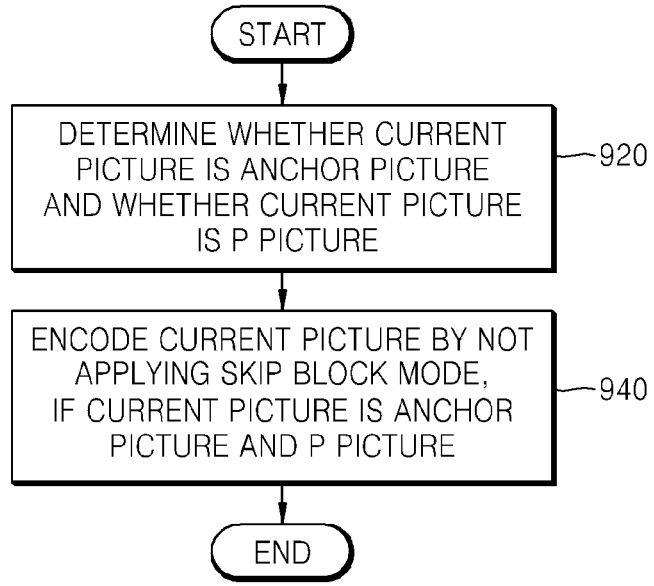
FIG. 9 is a flowchart of an encoding method performed by the multi-view video encoding apparatus illustrated in FIG. 5, according to an embodiment of the present invention.

FIG. 9 is a flowchart of an encoding method performed by the multi-view video encoding apparatus illustrated in FIG. 5, according to an embodiment of the present invention.

According to the current embodiment of the present invention, in order to control whether to apply a skip block mode to blocks of an anchor picture, it is determined whether a current picture is the anchor picture and a picture type of the current picture is also determined. In accordance with determination results, application of the skip block mode to the current picture is selectively allowed.

Referring to FIG. 9, in operation 920, it is determined whether the current picture is the anchor picture and, if the current picture is the anchor picture, it is determined whether the current picture is a P picture. For example, it is determined whether the current picture is the anchor picture and whether the current picture is the P picture, on the basis of header information of an input picture.

In operation 940, if the current picture is the anchor picture and the P picture, the skip block mode is not applied to the blocks of the current picture. Meanwhile, if the current picture is not the anchor picture or if the current picture is the anchor picture and is not the P picture, a conventional image encoding process is performed on the current picture and the skip block mode is selectively applied to the blocks of the current picture.

Figure 10:
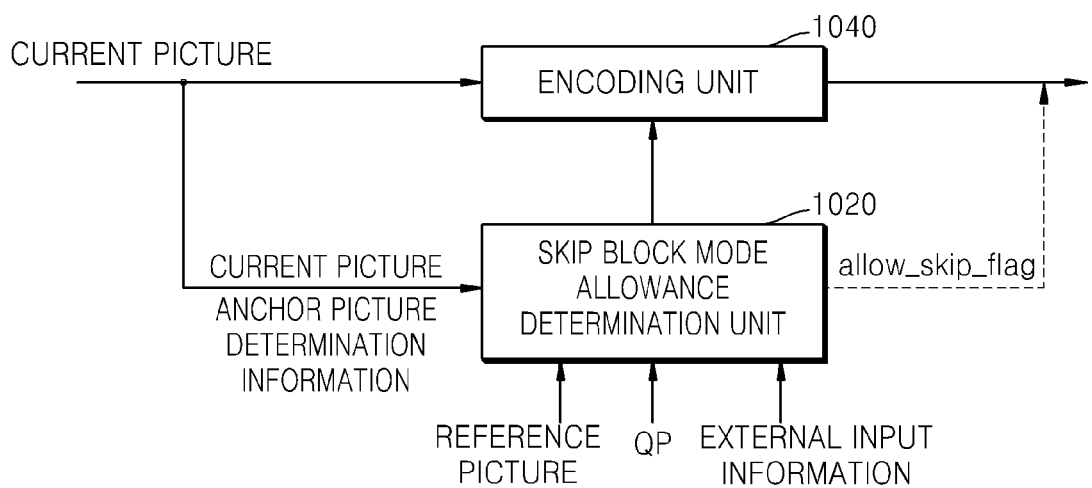
FIG. 10 is a block diagram of a multi-view video encoding apparatus according to another embodiment of the present invention.

FIG. 10 is a block diagram of a multi-view video encoding apparatus according to another embodiment of the present invention.

Referring to FIG. 10, the multi-view video encoding apparatus according to the current embodiment of the present invention includes a skip block mode allowance determination unit 1020 and an encoding unit 1040.

According to the current embodiment of the present invention, in order to control whether to apply a skip block mode to blocks of a current picture, it is determined whether to allow application of the skip block mode to the current picture, on the basis of a current input picture, a reference picture, a quantization parameter, a user's input, and anchor picture determination information.

If the current picture is the anchor picture, the skip block mode allowance determination unit 1020 calculates absolute values TY, TU, and TV of differences respectively between Y, U, and V components of the reference picture and those of the current picture. If a sum of the absolute values TY, TU, and TV is greater than or equal to a threshold value K1, the skip block mode allowance determination unit 1020 does not allow the application of the skip block mode. For example, the threshold value K1 may be one.

Alternatively, the skip block mode allowance determination unit 1020 may determine whether to allow the application of the skip block mode, by respectively comparing the absolute values TY, TU, and TV with threshold values KY, KU, and KV of the Y, U, and V components.

Alternatively, if a value T obtained by combining the absolute values TY, TU, and TV is greater than or equal to a threshold value K2, the skip block mode allowance determination unit 1020 does not allow the application of the skip block mode. For example, $T=SQRT\ TY^2+TU^2+TV^2$, or $T=average\ (TY+TU+TV)$.

Alternatively, whether to allow the application of the skip block mode may be determined on the basis of a current quantization parameter QP. If the current quantization parameter QP is less than or equal to a predetermined threshold value QPT ($QP \leq QPT$), the application of the skip block mode is allowed. Otherwise, the application of the skip block mode is not allowed.

Alternatively, whether to allow the application of the skip block mode to the current picture may be determined in accordance with external input information such as a user's input. In more detail, if the current picture is the anchor picture, on/off information of 'allow_skip_flag' may be selected by a user as an input parameter when the current picture is encoded.

Alternatively, the threshold values KY, KU, KV, K1, K2, and QPT may be selected by the user as input parameters when the current picture is encoded.

Alternatively, the skip block mode allowance determination unit 1020 may determine whether to allow the application of the skip block mode in accordance with various standards on the basis of the external input information.

If it is determined not to allow the application of the skip block mode to the current picture, the skip block mode allowance determination unit 1020 transmits a control signal indicating not to apply the skip block mode when the current picture is encoded, to the encoding unit 1040.

Meanwhile, if it is determined to allow the application of the skip block mode to the current picture, the encoding unit

1040 selectively applies the skip block mode to the blocks of the current picture in accordance with a conventional image encoding process.

If the control signal indicating not to apply the skip block mode to the blocks of the current picture is received from the skip block mode allowance determination unit 1020, the encoding unit 1040 does not apply the skip block mode. If the control signal indicating not to apply the skip block mode to the blocks of the current picture is not received or if a control signal indicating to allow the application of the skip block mode to the blocks of the current picture is received from the skip block mode allowance determination unit 1020, the encoding unit 1040 selectively applies the skip block mode to the blocks of the current picture.

A conventional image encoder supporting the skip block mode may be used as the encoding unit 1040. If the skip block mode is selectively applied to the blocks of the current picture, the encoding unit 1040 encodes and outputs information indicating that the skip block mode is selectively applied.

If the skip block mode is not applied to the blocks of the current picture, the encoding unit 1040 encodes and outputs information indicating that the skip block mode is not applied.

Alternatively, the encoding unit 1040 may encode and output information indicating whether the application of the skip block mode is allowed.

Table 3 shows an example when slice header data of slice data syntax according to an MVC standard is modified by using ⓐllow_skip_flag☐ so that the multi-view video encoding apparatus illustrated in FIG. 10 is implemented, according to an embodiment of the present invention.

TABLE 3

| slice_header( ) { | C | Descriptor |
|---|---|---|
| First_mb_in_slice | 2 | ue(v) |
| slice_type | 2 | ue(v) |
| if( anchor_pic_flag) | | |
| Allow_skip_flag | 2 | u(1) |
| } | | |

ⓐnchor_pic_flag☐is information included in a NAL unit of a current slice and indicates whether a current picture is an anchor picture. For example, if the current picture is the anchor picture, 'anchor_pic_flag=1'.

According to the current embodiment of the present invention, if the current picture is the anchor picture, information indicating whether to allow application of a skip block mode to the current picture may be coded by adding ⓐllow_skip_flag☐ ⓐllow_skip_flag☐may have a value 1 if the application of the skip block mode is allowed, or may have a value 0 if the application of the skip block mode is not allowed.

Table 4 shows an example when slice data syntax according to an MVC standard is modified in relation with the slice header syntax shown in Table 3 so that the multi-view video encoding apparatus illustrated in FIG. 10 is implemented, according to an embodiment of the present invention.

TABLE 4

| slice_data( ) { | C | Descriptor |
|---|---|---|
| if( entropy_coding_mode_flag ) | | |
| while( !byte_aligned ( ) ) | | |
| cabac_alignment_one_bit | 2 | f(1) |
| CurrMbAddr = first_mb_in_slice * | | |
| (1 + MbaffFrameFlag ) | | |
| moreDataFlag = 1 | | |

TABLE 4-continued

| slice_data( ) { | C | Descriptor |
|---|---|---|
| prevMbSkipped = 0 | | |
| do { | | |
| if( slice_type != \| && slice_type != SI ) | | |
| if( !anchor_pic_flag \|\| allow_skip_flag) { | | |
| if( !entropy_coding_mode_flag) { | | |
| mb_skip_run | 2 | ue(v) |
| prevMbSkipped = (mb_skip_run > 0 ) | | |
| for( i=0; i<mb_skip_run; i++ ) | | |
| CurrMbAddr = NextMbAddress( | | |
| CurrMbAddr ) | | |
| moreDataFlag = more_rbsp_data( ) | | |
| }else{ | | |
| mb_skip_flag | 2 | ae(v) |
| moreDataFlag = !mb_skip_flag | | |
| } | | |
| } | | |
| if( moreDataFlag) { | | |
| if( MbaffFrameFlag && ( CurrMbAddr % 2 == | | |
| 0 \|\| ( CurrMbAddr % 2 == 1 && | | |
| prevMbSkipped)) ) | | |
| mb_field_decoding_flag | 2 | u(1)\|ae(v) |
| macroblock_layer( ) | 2\|3\|4 | |
| } | | |
| if( !entropy_coding_mode_flag ) | | |
| moreDataFlag = more_rbsp_data( ) | | |
| else { | | |
| if( slice_type != \| && slice_type != SI ) | | |
| prevMbSkipped = mb_skip_flag | | |
| if( MbaffFrameFlag && CurrMbAddr | | |
| % 2 == 0 ) | | |
| moreDataFlag = 1 | | |
| else { | | |
| end_of_slice_flag | 2 | ae(v) |
| moreDataFlag = !end_of slice flag | | |
| } | | |
| } | | |
| CurrMbAddr = NextMbAddress( CurrMbAddr ) | | |
| } while( moreDataFlag ) | | |
| } | | |

If a current picture is not an anchor picture, or if the current picture is the anchor picture and ⓐllow_skip_flag☐has a value 1, information indicating whether to allow application of a skip block mode is coded. If the current picture is the anchor picture and ⓐllow_skip_flag☐has a value 0, the information indicating whether to allow the application of the skip block mode is not coded.

Figure 11:
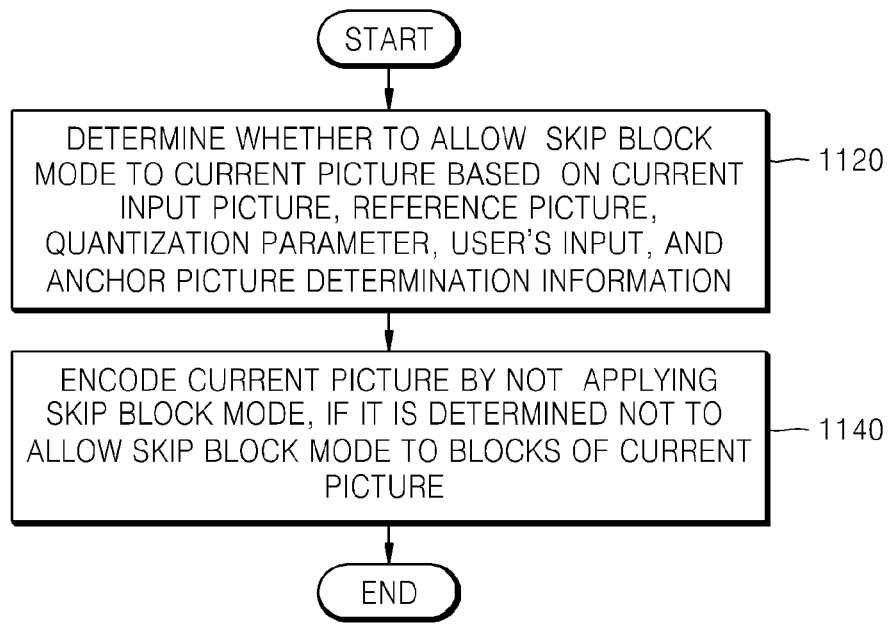
FIG. 11 is a flowchart of an encoding method performed by the multi-view video encoding apparatus illustrated in FIG. 10, according to an embodiment of the present invention.

FIG. 11 is a flowchart of an encoding method performed by the multi-view video encoding apparatus illustrated in FIG. 10, according to an embodiment of the present invention.

Referring to FIG. 11, in operation 1120, in order to determine whether to allow application of a skip block mode to an anchor picture, it is determined whether to allow the application of the skip block mode to a current picture, on the basis of a current input picture, a reference picture, a quantization parameter, a userⓐ input, and anchor picture determination information.

Also, whether to allow the application of the skip block mode may be determined in accordance with various standards by the skip block mode allowance determination unit 1020 illustrated in FIG. 10. Selectively, information indicating whether the application of the skip block mode is allowed, is generated and output.

In operation 1140, if it is determined that the skip block mode is not applied to blocks of the current picture, the skip block mode is not applied to the blocks of the current picture. Meanwhile, if it is determined that the application of the skip block mode to the current picture is allowed, a conventional image encoding process is performed on the current picture and the skip block mode is selectively applied to the blocks of the current picture. Selectively, information indicating whether the application of the skip block mode is allowed, is generated and output.

Figure 12:
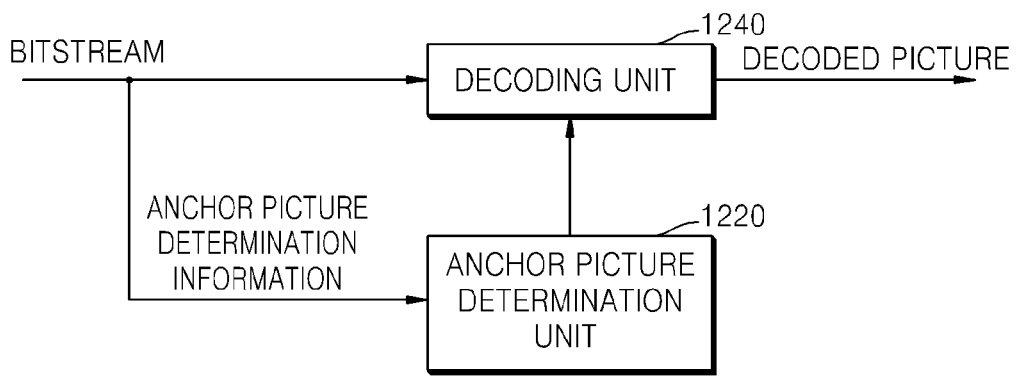
FIG. 12 is a block diagram of a multi-view video decoding apparatus according to an embodiment of the present invention.

FIG. 12 is a block diagram of a multi-view video decoding apparatus corresponding to the multi-view video encoding apparatus illustrated in FIG. 3, according to an embodiment of the present invention.

Referring to FIG. 12, the multi-view video decoding apparatus according to the current embodiment of the present invention includes an anchor picture determination unit 1220 and a decoding unit 1240.

The anchor picture determination unit 1220 determines whether a current picture is an anchor picture by using anchor picture determination information of an encoded input bitstream, such as header information, and thus determines whether application of a skip block mode to blocks of the current picture has been allowed when the current picture has been encoded. If the current picture is the anchor picture, the anchor picture determination unit 1220 transmits a control signal indicating that the skip block mode has not been applied to blocks of the current picture, to the decoding unit 1240. Alternatively, it is determined whether the application of the skip block mode has been allowed, by using information indicating whether the application of the skip block mode to the blocks of the current picture has been allowed, which is included in the input bitstream.

Meanwhile, if the current picture is not the anchor picture, the decoding unit 1240 determines whether the skip block mode has been applied, in accordance with a conventional image decoding process.

If the control signal indicating that the skip block mode has not been applied to the blocks of the current picture, is received from the anchor picture determination unit 1220, the decoding unit 1240 decodes image data of the current picture. If the control signal indicating that the skip block mode has not been applied to the blocks of the current picture, is not received or if a control signal indicating that the application of the skip block mode has been allowed, is received from the anchor picture determination unit 1220, the decoding unit 1240 selectively decodes the image data of the current picture. For example, if the application of the skip block mode to the image data of the current picture has been allowed, the decoding unit 1240 decodes information indicating whether the skip block mode has been applied to a current block and thus decodes the image data of the current picture. A conventional image decoder supporting the skip block mode may be used as the decoding unit 1240.

Figure 13:
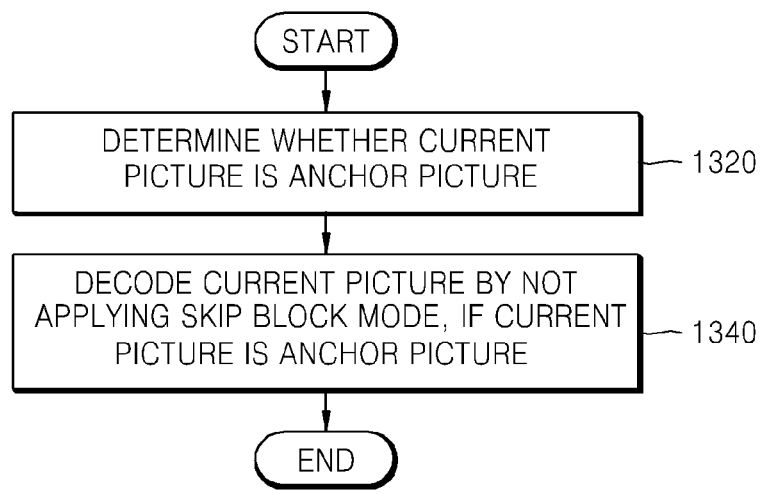
FIG. 13 is a flowchart of a decoding method performed by the multi-view video decoding apparatus illustrated in FIG. 12, according to an embodiment of the present invention.

FIG. 13 is a flowchart of a decoding method performed by the multi-view video decoding apparatus illustrated in FIG. 12, according to an embodiment of the present invention.

Referring to FIG. 13, in operation 1320, it is determined whether application of a skip block mode to a current picture has been allowed, in accordance with a fact whether the current picture is an anchor picture. For example, it is determined whether the current picture is the anchor picture, on the basis of header information of an input bitstream.

In operation 1340, if the current picture is the anchor picture, the skip block mode is not applied to blocks of the current picture when the current picture is decoded. Meanwhile, if the current picture is not the anchor picture, a conventional image decoding process is performed on the current picture. In more detail, information indicating whether the skip block mode has been applied, is decoded and thus image data of the current picture is decoded.

Figure 14:
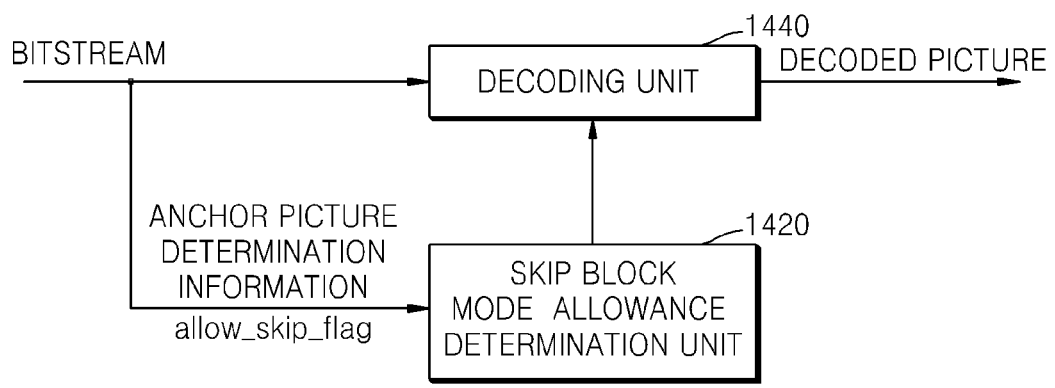
FIG. 14 is a block diagram of a multi-view video decoding apparatus according to another embodiment of the present invention.

FIG. 14 is a block diagram of a multi-view video decoding apparatus corresponding to the multi-view video encoding apparatus illustrated in FIG. 5, according to an embodiment of the present invention.

Referring to FIG. 14, the multi-view video decoding apparatus according to the current embodiment of the present invention includes a skip block mode allowance determination unit 1420 and a decoding unit 1440.

The skip block mode allowance determination unit 1420 extracts anchor picture determination information and picture type information from an encoded input bitstream, and determines whether a skip block mode has been applied to a current picture. For example, the skip block mode allowance determination unit 1420 determines whether the current picture is an anchor picture and determines a picture type of the current picture, by using header information of the input bitstream, and thus determines whether application of the skip block mode to the current picture has been allowed. For example, if the current picture is the anchor picture and a P picture, it is determined that the application of the skip block mode to the current picture has not been allowed.

If it is determined that the application of the skip block mode to the current picture has not been allowed, the skip block mode allowance determination unit 1420 transmits information indicating that the skip block mode has not been applied to blocks of the current picture, to the decoding unit 1440. Meanwhile, if the current picture is not the anchor picture or if the current picture is the anchor picture and is not the P picture but, for example, a B picture, the decoding unit 1440 decodes the current picture in accordance with a conventional video decoding process.

If the information indicating that the skip block mode has not been applied to the blocks of the current picture is received from the skip block mode allowance determination unit 1420, the decoding unit 1440 regards that the skip block mode has not been applied to the blocks of the current picture and decodes image data of the current picture. If the information indicating that the application of the skip block mode to the current picture has not been allowed, is not received or information indicating that the application of the skip block mode to the current picture has been allowed, is received from the skip block mode allowance determination unit 1420, the decoding unit 1440 selectively applies the skip block mode to the blocks of the current picture when the current picture is decoded. For example, information indicating whether the skip block mode has been applied to a current block, is decoded and thus the image data of the current picture is decoded.

A conventional image decoder supporting the skip block mode may be used as the decoding unit 1440.

Figure 15:
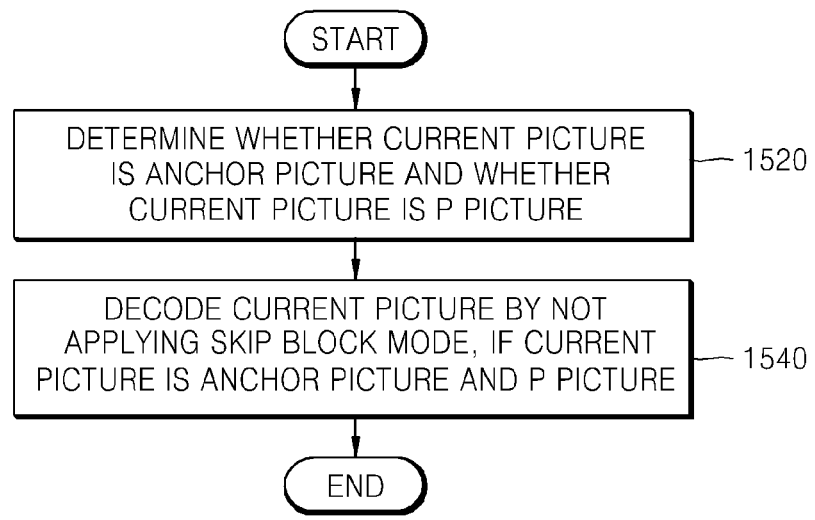
FIG. 15 is a flowchart of a decoding method performed by the multi-view video decoding apparatus illustrated in FIG. 14, according to an embodiment of the present invention.

FIG. 15 is a flowchart of a decoding method performed by the multi-view video decoding apparatus illustrated in FIG. 14, according to an embodiment of the present invention.

Referring to FIG. 15, in operation 1520, it is determined whether a current picture is an anchor picture and, if the current picture is the anchor picture, it is determined whether the current picture is a P picture. For example, it is determined whether the current picture is the anchor picture and whether the current picture is the P picture, on the basis of header information of an input bitstream.

In operation 1540, if the current picture is the anchor picture and the P picture, it is determined that a skip block mode has not been applied to blocks of the current picture, and the skip block mode is not applied to the blocks of the current picture when image data of the current picture is decoded. Meanwhile, if the current picture is not the anchor picture or if the current picture is the anchor picture and is not the P picture, a conventional image decoding process is performed on the current picture. For example, information indicating whether the skip block mode has been applied to the blocks of the current block, is decoded and thus the current picture is decoded on the basis of the decoded information.

Figure 16:
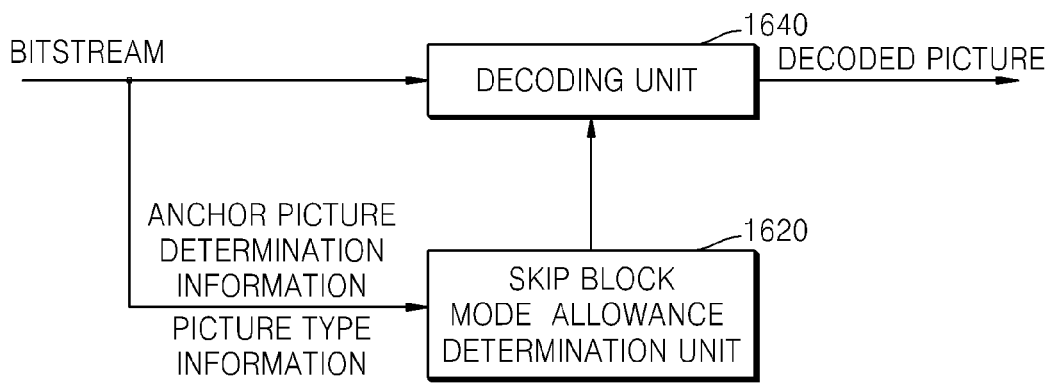
FIG. 16 is a block diagram of a multi-view video decoding apparatus according to another embodiment of the present invention.

FIG. 16 is a block diagram of a multi-view video decoding apparatus corresponding to the multi-view video encoding apparatus illustrated in FIG. 10, according to an embodiment of the present invention.

Referring to FIG. 16, the multi-view video decoding apparatus according to the current embodiment of the present invention includes a skip block mode allowance determination unit 1620 and a decoding unit 1640.

The skip block mode allowance determination unit 1620 extracts anchor picture determination information from an input bitstream, and determines whether a current picture is an anchor picture. If the current picture is the anchor picture, it is determined whether application of a skip block mode to blocks of the current picture has been allowed, by decoding skip block mode application allowance information.

If it is determined that the application of the skip block mode to the blocks of the current picture has not been allowed, the skip block mode allowance determination unit 1620 transmits information indicating that the skip block mode has not been applied to the blocks of the current picture, to the decoding unit 1640. Alternatively, the skip block mode allowance determination unit 1620 transmits information indicating whether the application of the skip block mode to the current picture has been allowed, to the decoding unit 1640.

If the information indicating that the skip block mode has not been applied to the blocks of the current picture is received from the skip block mode allowance determination unit 1620, the decoding unit 1640 regards that the skip block mode has not been applied to the blocks of the current picture and decodes image data of the current picture. If the information indicating that the skip block mode has not been applied to the blocks of the current picture is not received or information indicating that the application of the skip block mode to the current picture has been allowed, is received from the skip block mode allowance determination unit 1620, the decoding unit 1640 selectively applies the skip block mode to the blocks of the current picture when the current picture is decoded. For example, the information indicating whether the application of the skip block mode to the current picture has been allowed, is decoded and thus the image data of the current picture is decoded. A conventional image decoder supporting the skip block mode may be used as the decoding unit 1640.

Figure 17:
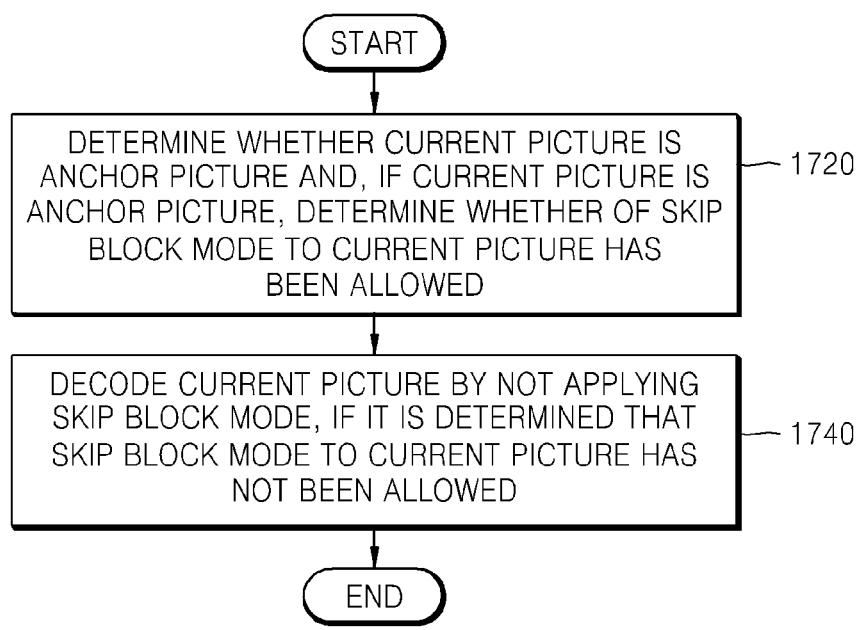
FIG. 17 is a flowchart of a decoding method performed by the multi-view video decoding apparatus illustrated in FIG. 16, according to an embodiment of the present invention.

FIG. 17 is a flowchart of a decoding method performed by the multi-view video decoding apparatus illustrated in FIG. 16, according to an embodiment of the present invention.

Referring to FIG. 17, in operation 1720, it is determined whether a current picture is an anchor picture and, if the current picture is the anchor picture, information indicating whether a skip block mode has been applied to image data of the current picture, is decoded and thus it is determined whether application of the skip block mode to the current picture has been allowed.

In operation 1740, if it is determined that the skip block mode has not been applied to blocks of the current picture, the skip block mode is not applied to the blocks of the current picture when the current picture is decoded. Meanwhile, if it is determined that the skip block mode has been applied to the blocks of the current picture, a conventional image decoding process is performed on the current picture. For example, information indicating whether the skip block mode has been applied to the blocks of the current block, is decoded and thus the current picture is decoded on the basis of the decoded information.

As described above, according to the present invention, when multi-view video data is coded, image quality and coding efficiency may be improved by selectively applying a skip block mode to blocks of anchor pictures which perform only inter-view reference.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of encoding multi-view video data, the method comprising:
    determining whether a current picture is an anchor picture; and
    encoding blocks of the current picture by not applying a skip block mode to the blocks if the current picture is the anchor picture,
    wherein a block to which the skip block mode is applied, is not encoded,
    wherein the anchor picture is at a first temporal point or at a multiple nth temporal point,
    wherein n is an integer value, and
    wherein the anchor picture performs prediction only in the view direction using another anchor picture in a same temporal point.

2. The method of claim 1, wherein, if the skip block mode is applied to a current block, the current block is restored by using image data of a block of a reference picture, which is disposed at the same position as the current block, or by using image data of a block corresponding to motion information that is obtained based on motion information of neighboring blocks of the current block.

3. A method of encoding multi-view video data, the method comprising:
    determining whether to allow application of a skip block mode, if the current picture is an anchor picture; and
    selectively applying the skip block mode to blocks of the current picture, if the application of the skip block mode is allowed,
    wherein a block to which the skip block mode is applied is, not encoded,
    wherein the anchor picture is at a first temporal point or at a multiple nth temporal point,
    wherein n is an integer value, and
    wherein the anchor picture performs prediction only in the view direction using another anchor picture in a same temporal point.

4. The method of claim 3, wherein, if the skip block mode is applied to a current block, the current block is restored by using image data of a block of a reference picture, which is disposed at the same position as the current block, or by using image data of a block corresponding to motion information that is obtained based on motion information of neighboring blocks of the current block.

5. The method of claim 3, wherein the determining whether to allow the application of the skip block mode, is based on a picture type of the current picture, and wherein the application of the skip block mode is not allowed if the picture type is a P type.

6. The method of claim 3, wherein the skip block mode is applied to a Moving Picture Expert Group-4 (MPEG-4) standard, an H. 264 standard, or a multi-view video coding (MVC) standard.

7. The method of claim 3, wherein the determining whether to allow the application of the skip block mode, is based on at least one of a current input picture, a reference picture, a quantization parameter, and external input information.

8. An apparatus for encoding multi-view video data, the apparatus comprising:

an anchor picture determination unit which determines whether a current picture is an anchor picture; and an encoding unit which encodes blocks of the current picture by not applying a skip block mode to the blocks if the current picture is the anchor picture, wherein the encoding unit does not encode a block to which the skip block mode is applied, wherein the anchor picture is at a first temporal point or at a multiple nth temporal point, wherein n is an integer value, and wherein the anchor picture performs prediction only in the view direction using another anchor picture in a same temporal point.

9. The apparatus of claim 8, wherein, if the skip block mode is applied to a current block, the current block is restored by using image data of a block of a reference picture, which is disposed at the same position as the current block, or by using image data of a block corresponding to motion information that is obtained based on motion information of neighboring blocks of the current block.

10. An apparatus for encoding multi-view video data, the apparatus comprising:

a skip block mode allowance determination unit which determines, in a determination, whether to allow application of a skip block mode, if the current picture is an anchor picture; and an encoding unit which selectively applies the skip block mode to blocks of the current picture, in accordance with a result of the determination, wherein the encoding unit does not encode a block to which the skip block mode is applied, wherein the anchor picture is at a first temporal point or at a multiple nth temporal point, wherein n is an integer value, and wherein the anchor picture performs prediction only in the view direction using another anchor picture in a same temporal point.

11. The apparatus of claim 10, wherein, if the skip block mode is applied to a current block, the current block is restored by using image data of a block of a reference picture, which is disposed at the same position as the current block, or by using image data of a block corresponding to motion information that is obtained based on motion information of neighboring blocks of the current block.

12. The apparatus of claim 10, wherein the skip block mode allowance determination unit determines whether to allow the application of the skip block mode, based on a picture type of the current picture, and does not allow the application of the skip block mode if the picture type is a P type.

13. The apparatus of claim 10, wherein the skip block mode is applied to a Moving Picture Expert Group-4 (MPEG-4) standard, an H. 264 standard, or a multi-view video coding (MVC) standard.

14. The apparatus of claim 10, wherein the skip block mode allowance determination unit determines whether to allow the application of the skip block mode, based on at least one of a current input picture, a reference picture, a quantization parameter, and external input information.

15. A method of decoding multi-view video data, the method comprising:

determining whether a current picture is an anchor picture; and decoding blocks of the current picture by not applying a skip block mode to the blocks if the current picture is the anchor picture, wherein a block to which the skip block mode is applied, is not decoded.

wherein the anchor picture is at a first temporal point or at a multiple nth temporal point, wherein n is an integer value, wherein the anchor picture performs prediction only in the view direction using another anchor picture in a same temporal point.

16. The method of claim 15, wherein, if the skip block mode is applied to a current block, the current block is restored by using image data of a block of a reference picture, which is disposed at the same position as the current block, or by using image data of a block corresponding to motion information that is obtained based on motion information of neighboring blocks of the current block.

17. A method of decoding multi-view video data, the method comprising:

determining whether to allow application of a skip block mode, if the current picture is an anchor picture; and selectively applying the skip block mode to blocks of the current picture, in accordance with a result of the determining, wherein a block to which the skip block mode is applied, is not decoded, wherein the anchor picture is at a first temporal point or at a multiple nth temporal point, wherein n is an integer value, and wherein the anchor picture performs prediction only in the view direction using another anchor picture in a same temporal point.

18. The method of claim 17, wherein, if the skip block mode is applied to a current block, the current block is restored by using image data of a block of a reference picture, which is disposed at the same position as the current block, or by using image data of a block corresponding to motion information that is obtained based on motion information of neighboring blocks of the current block.

19. The method of claim 17, wherein the determining whether to allow the application of the skip block mode, is based on a picture type of the current picture, and wherein the application of the skip block mode is not allowed if the picture type is a P type.

20. The method of claim 17, wherein the skip block mode is applied to a Moving Picture Expert Group-4 (MPEG-4) standard, an H. 264 standard, or a multi-view video coding (MVC) standard.

21. An apparatus for decoding multi-view video data, the apparatus comprising:

an anchor picture determination unit which determines whether a current picture is an anchor picture; and a decoding unit which decodes blocks of the current picture by not applying a skip block mode to the blocks if the current picture is the anchor picture,
wherein the decoding unit does not decode a block to which the skip block mode is applied,
wherein the anchor picture is at a first temporal point or at a multiple nth temporal point,
wherein n is an integer value,
wherein the anchor picture performs prediction only in the view direction using another anchor picture in a same temporal point.

22. The apparatus of claim 21, wherein, if the skip block mode is applied to a current block, the current block is restored by using image data of a block of a reference picture, which is disposed at the same position as the current block, or by using image data of a block corresponding to motion information that is obtained based on motion information of neighboring blocks of the current block.

23. An apparatus for decoding multi-view video data, the apparatus comprising:
a skip block mode allowance determination unit which determines, in a determination, whether to allow application of a skip block mode, if the current picture is an anchor picture; and
a decoding unit which selectively applies the skip block mode to blocks of the current picture, in accordance with a result of the determination,
wherein the decoding unit does not decode a block to which the skip block mode is applied,
wherein the anchor picture is at a first temporal point or at a multiple nth temporal point,
wherein n is an integer value, and
wherein the anchor picture performs prediction only in the view direction using another anchor picture in a same temporal point.

24. The apparatus of claim 23, wherein, if the skip block mode is applied to a current block, the current block is restored by using image data of a block of a reference picture, which is disposed at the same position as the current block, or by using image data of a block corresponding to motion information that is obtained based on motion information of neighboring blocks of the current block.

25. The apparatus of claim 23, wherein the skip block mode allowance determination unit determines whether to allow the application of the skip block mode, based on a picture type of the current picture, and does not allow the application of the skip block mode if the picture type is a P type.

26. The apparatus of claim 23, wherein the skip block mode is applied to a Moving Picture Expert Group-4 (MPEG-4) standard, an H. 264 standard, or a multi-view video coding (MVC) standard.

27. A non-transitory computer readable recording medium having recorded thereon a computer program for executing a method of encoding multi-view video data, the method comprising:
determining whether a current picture is an anchor picture; and
encoding blocks of the current picture by not applying a skip block mode to the blocks if the current picture is the anchor picture,
wherein a block to which the skip block mode is applied, is not encoded,
wherein the anchor picture is at a first temporal point or at a multiple nth temporal point,
wherein n is an integer value, and
wherein the anchor picture performs prediction only in the view direction using another anchor picture in a same temporal point.

28. A non-transitory computer readable recording medium having recorded thereon a computer program for executing a method of encoding multi-view video data, the method comprising:
determining, in a determination, whether to allow application of a skip block mode, if the current picture is an anchor picture; and
selectively applying the skip block mode to blocks of the current picture, in accordance with a result of the determination,
wherein a block to which the skip block mode is applied, is not encoded,
wherein the anchor picture is at a first temporal point or at a multiple nth temporal point,
wherein n is an integer value, and
wherein the anchor picture performs prediction only in the view direction using another anchor picture in a same temporal point.

29. A non-transitory computer readable recording medium having recorded thereon a computer program for executing a method of decoding multi-view video data, the method comprising:
determining whether a current picture is an anchor picture; and
decoding blocks of the current picture by not applying a skip block mode to the blocks if the current picture is the anchor picture,
wherein a block to which the skip block mode is applied, is not decoded,
wherein the anchor picture is at a first temporal point or at a multiple nth temporal point,
wherein n is an integer value, and
wherein the anchor picture performs prediction only in the view direction using another anchor picture in a same temporal point.

30. A non-transitory computer readable recording medium having recorded thereon a computer program for executing a method of decoding multi-view video data, the method comprising:
determining, in a determination, whether to allow application of a skip block mode, if the current picture is an anchor picture; and
selectively applying the skip block mode to blocks of the current picture, in accordance with a result of the determination,
wherein a block to which the skip block mode is applied, is not decoded,
wherein the anchor picture is at a first temporal point or at a multiple nth temporal point,
wherein n is an integer value, and
wherein the anchor picture performs prediction only in the view direction using another anchor picture in a same temporal point.

31. The method of claim 1, wherein when the current picture is the anchor picture and the skip block mode is not applied to blocks of the current picture, an image quality of the anchor picture is improved.

32. The method of claim 1, wherein when the current picture is the anchor picture and the skip block mode is not applied to blocks of the current picture, an image quality of other pictures that refer to the anchor picture is improved.

33. The method of claim 1, wherein a non-anchor picture performs prediction in a temporal direction.

* * * * *